(12) United States Patent
Zhang

(10) Patent No.: US 10,337,448 B2
(45) Date of Patent: Jul. 2, 2019

(54) METHODS AND SYSTEMS FOR A FUEL INJECTOR ASSEMBLY

(71) Applicant: Ford Global Technologies, LLC, Dearborn, MI (US)

(72) Inventor: Xiaogang Zhang, Novi, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 14/978,801

(22) Filed: Dec. 22, 2015

(65) Prior Publication Data
US 2017/0175667 A1   Jun. 22, 2017

(51) Int. Cl.
| | |
|---|---|
| F02D 41/40 | (2006.01) |
| F02D 41/20 | (2006.01) |
| F02M 51/06 | (2006.01) |
| F02D 41/38 | (2006.01) |
| F02M 61/18 | (2006.01) |
| F02M 45/08 | (2006.01) |

(52) U.S. Cl.
CPC ........... *F02D 41/403* (2013.01); *F02D 41/20* (2013.01); *F02D 41/38* (2013.01); *F02D 41/401* (2013.01); *F02D 41/402* (2013.01); *F02D 41/405* (2013.01); *F02M 51/0657* (2013.01); *F02D 2041/2034* (2013.01); *F02D 2041/2051* (2013.01); *F02D 2041/389* (2013.01); *F02M 45/08* (2013.01); *F02M 61/182* (2013.01); *F02M 61/1893* (2013.01); *Y02T 10/44* (2013.01)

(58) Field of Classification Search
CPC ........ F02M 51/06; F02M 61/16; F02M 61/18; F02M 61/1818; F02M 61/1826; F02M 61/1833; F02M 61/168; F02M 61/186

USPC .......... 123/445, 469, 470, 471, 478
See application file for complete search history.

(56) References Cited

U.S. PATENT DOCUMENTS

| | | | |
|---|---|---|---|
| 5,458,292 A | 10/1995 | Hapeman | |
| 6,467,702 B1* | 10/2002 | Lambert | F02M 45/086 239/533.12 |
| 8,011,600 B2 | 9/2011 | Gray, Jr. | |
| 2004/0237929 A1 | 12/2004 | Cavanagh et al. | |
| 2013/0026256 A1* | 1/2013 | Okamoto | F02M 61/186 239/487 |
| 2014/0034023 A1 | 2/2014 | Coldren | |
| 2015/0021416 A1* | 1/2015 | Raney | F02M 61/1806 239/558 |
| 2015/0204291 A1* | 7/2015 | Schnobrich | F02M 61/184 239/584 |
| 2015/0211461 A1* | 7/2015 | Shirk | F02M 61/1833 239/557 |
| 2016/0025052 A1* | 1/2016 | Yasukawa | F02M 51/0671 239/585.1 |

* cited by examiner

*Primary Examiner* — John Kwon
*Assistant Examiner* — Johnny H Hoang
(74) *Attorney, Agent, or Firm* — Julia Voutyras; McCoy Russell LLP

(57) ABSTRACT

Methods and systems are provided for moving an injector needle of a fuel injector assembly from a first position to a second position to provide a first fuel injection at the first position, and moving the needle from the second position to the third position to provide a second fuel injection at the third position, and moving the needle back to the first position via the second position, and providing a third fuel injection at the second position. In this way, three fuel injections may be performed during a single actuation cycle of the injector during a single combustion cycle.

14 Claims, 13 Drawing Sheets

METHODS AND SYSTEMS FOR A FUEL INJECTOR ASSEMBLY

FIELD

The present description relates generally to methods and systems for a fuel injector assembly.

BACKGROUND/SUMMARY

Internal combustion engines are equipped with one or more fuel injectors for delivering fuel to the engine for combustion. During certain engine operating conditions, it may be desirable to perform more than one fuel injection. For example, a fuel injection event may be split into three separate fuel injections, such as a pilot injection, a main fuel injection, and a post fuel injection. As such, a pilot fuel injection is performed before the main fuel injection, and is provided to address combustion noise and enhance combustion while a post fuel injection is performed after the main fuel injection, and is provided for improved emission control. Thus, multiple split fuel injections may be performed during a single combustion cycle in order to improve engine performance and reduce emissions.

Fuel injectors are controlled by an engine controller, which provides an actuation signal to the injector for each fuel delivery event. Thus, for split fuel injections including a pilot, a main, and a post fuel injection event, three different actuation signals are provided to the injector. However, the inventors herein have recognized some issues with the above fuel injector control. As an example, when a time interval between two injections is short, providing an actuation signal for each injection can result in overlapping signals. Consequently, there is a limit on the minimum duration of the time interval. Thus, when short time intervals are desired, providing separate actuation signals for each injection can cause variability in the amount of fuel delivered and timing of each fuel delivery event. As a result, engine performance and emission control are compromised. Further, the injector cycles through an actuation cycle for each of the split fuel injections. This can cause additional wear and tear on the injector. Still further, as the engine controller is required to generate a signal for each of the split injections, the controller consumes more resources, thereby decreasing the efficiency of the control system.

In one example, the issues described above may be addressed by a method for a fuel injector comprising: controlling an actuator to move an injector needle from a first position to a third position via a second position; delivering a first fuel injection at the second position and a second fuel injection at the third position, and subsequently moving the needle from the third position to the first position via the second position; and delivering a third fuel injection at the second position. In this way, through a single actuation cycle of the injector comprising movement of the injector needle from the first position to third position via second position, and back to first position from third position via second position, three fuel injections may be performed. As a result, control of timing between two injections can be improved.

As one example, a fuel injector assembly may include a fuel injector body including an injector needle movable along a longitudinal axis of the assembly. The injector body may further include a first row of nozzles positioned above a second row of nozzles along the longitudinal axis. The injector needle may comprise a lower annulus cut portion that couples a fuel supply to either first or second row of nozzles based on a displacement of the needle. The fuel assembly further includes one or more retention springs positioned between an upper portion of the needle and the injector body to bias the needle in an upward direction away from the first and second row nozzles. The assembly also includes an actuator, which when activated pushes the injector needle against the force of the retention springs in a downward direction towards the first and the second row nozzles.

When an electric input is not supplied to the actuator, the needle is at rest or first position. At the first position, the annulus portion is above the first and the second row nozzles and therefore, not coupled to either first or second row nozzles. Thus, fuel delivery does not take place. In order to actuate the needle, an electric input may be initiated when the needle is at the first position and the input may be increased to move the needle downwards towards the first row of nozzles. As the needle travels downwards, the annulus portion couples with the first row nozzles at the second position, and pilot or first fuel injection begins via the first row of nozzles. In order to reach the third position, electric input may be further increased. As a result, the actuator may continue to push the needle downwards causing the annulus portion to decouple from the first row nozzles and subsequently couple with the second row nozzles at the third position. When the annulus portion is coupled with second row of nozzles, the needle may be held at the third position coupled to the second row of nozzles (by maintaining constant electrical input) for a desired duration to deliver the main or second fuel injection via the second row of nozzles. After delivering the main injection, the input may be decreased to move the needle back to the first position from the third position. As the input is decreased, the needle starts to move upwards away from the second row of nozzles to the rest position. En route to first position from third position, during the upward movement of the needle, the annulus cut portion is again coupled with the first row nozzles. During this time, post fuel injection is delivered via the first row of nozzles.

In this way, the fuel injector assembly may be operated to deliver a pilot, a main, and a post fuel injection during a single actuation cycle of the injector. By controlling the movement of the injector needle, rate, amount, and timing of each of the fuel injections can be controlled with increased precision. For example, as a desired time interval between a pilot and a main injection decreases, a rate of increase of electrical input provided to the actuator may be increased. As a result, the fuel injector assembly may be operated to achieve a technical effect of performing multiple injections with reduced time interval between any two injections during a single combustion event.

Further, a plurality of sealing rings, such as O-rings, may be provided along the injector body. For example, sealing rings may be provided in between the two rows of nozzles to achieve the technical effect of hermetically sealing the first row of nozzles from the second row of nozzles. Further, one or more sealing rings may be provided above the first row nozzles to achieve the technical effect of reduced dripping between the injector needle and the body when injector is at the first or rest position, for example.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
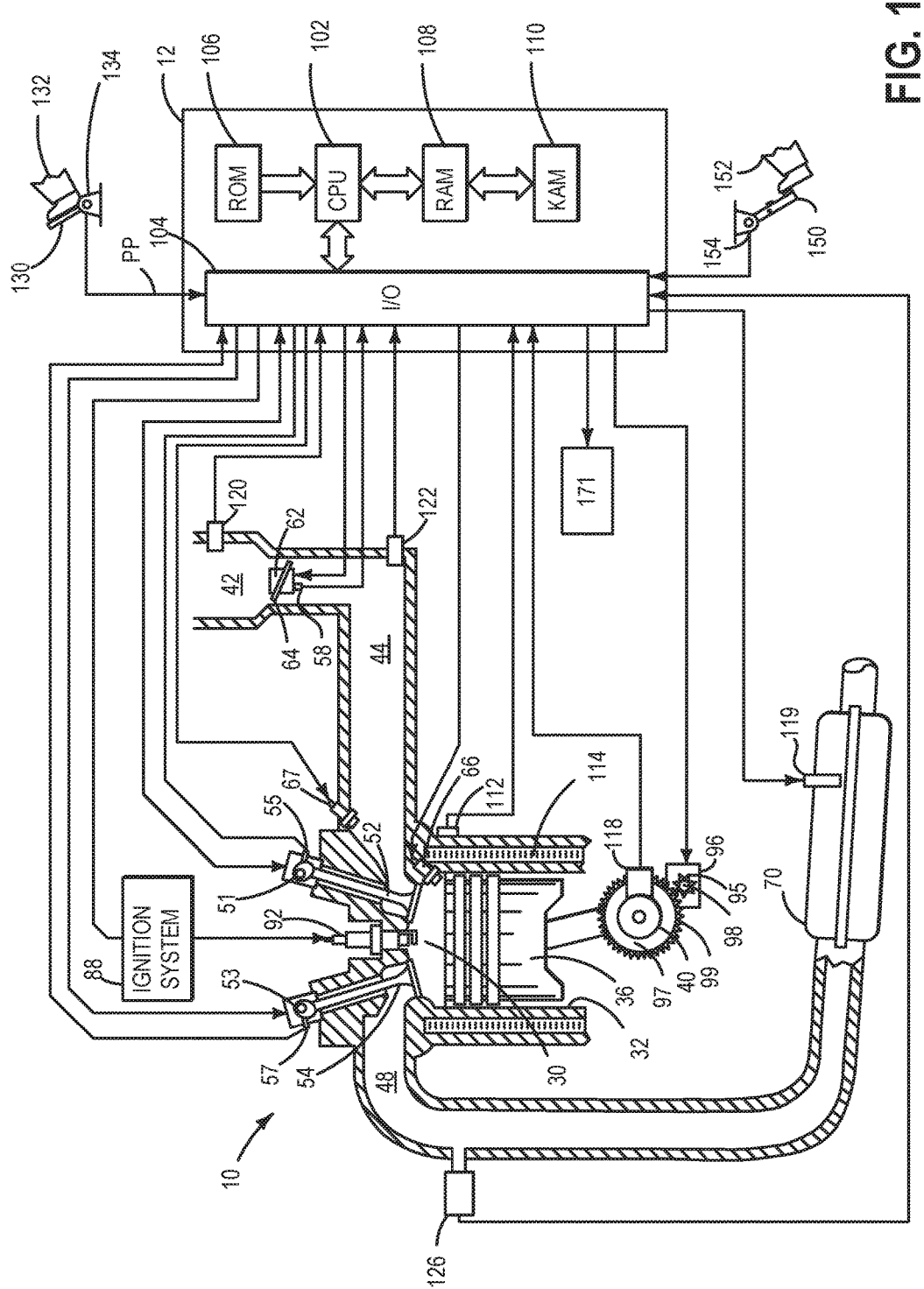
FIG. 1 shows a schematic depiction of an internal combustion engine.
Figure 10:
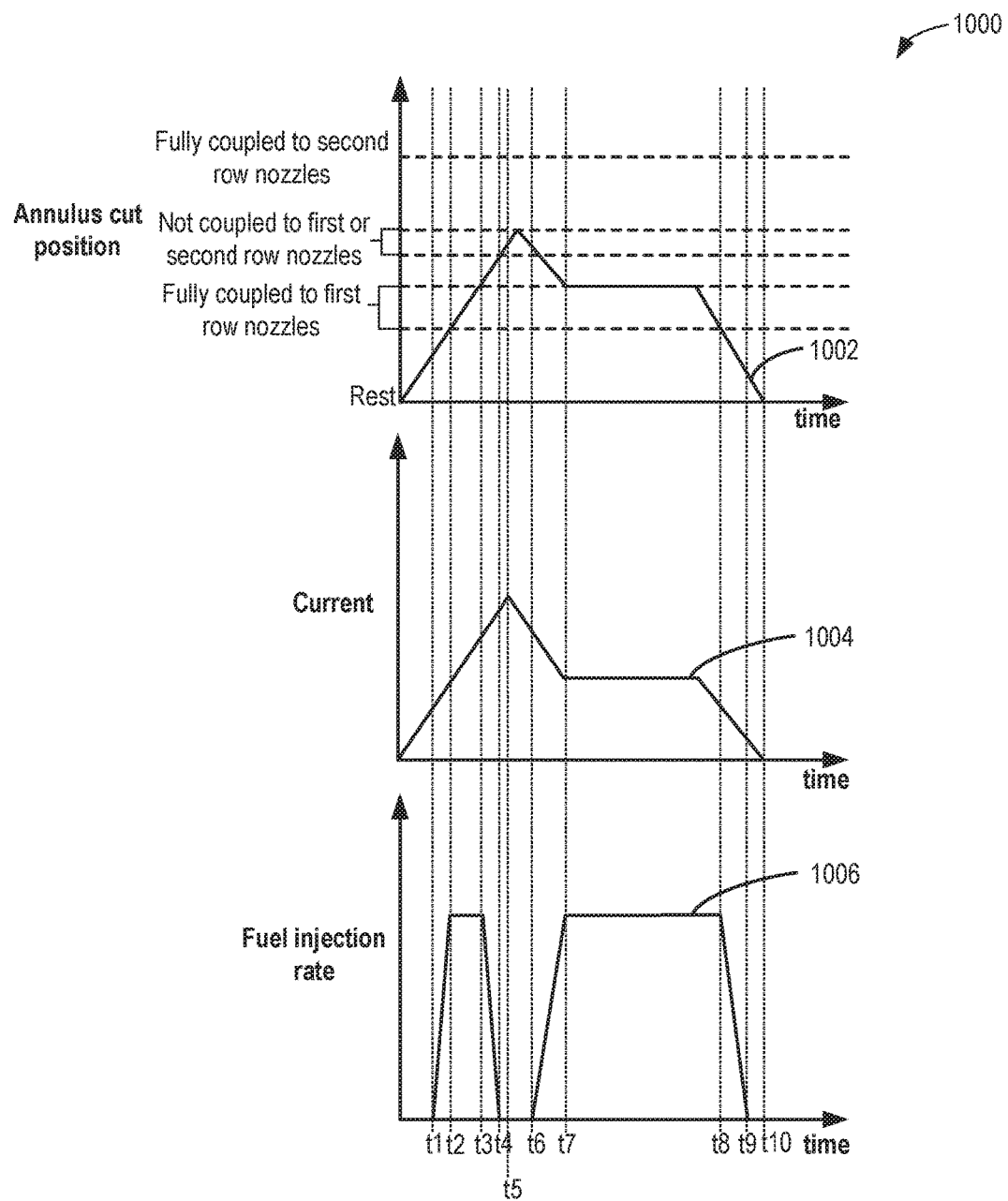
FIG. 10 shows an example operating sequence for performing a pilot and a main fuel injection according to the present disclosure.
Figure 11:
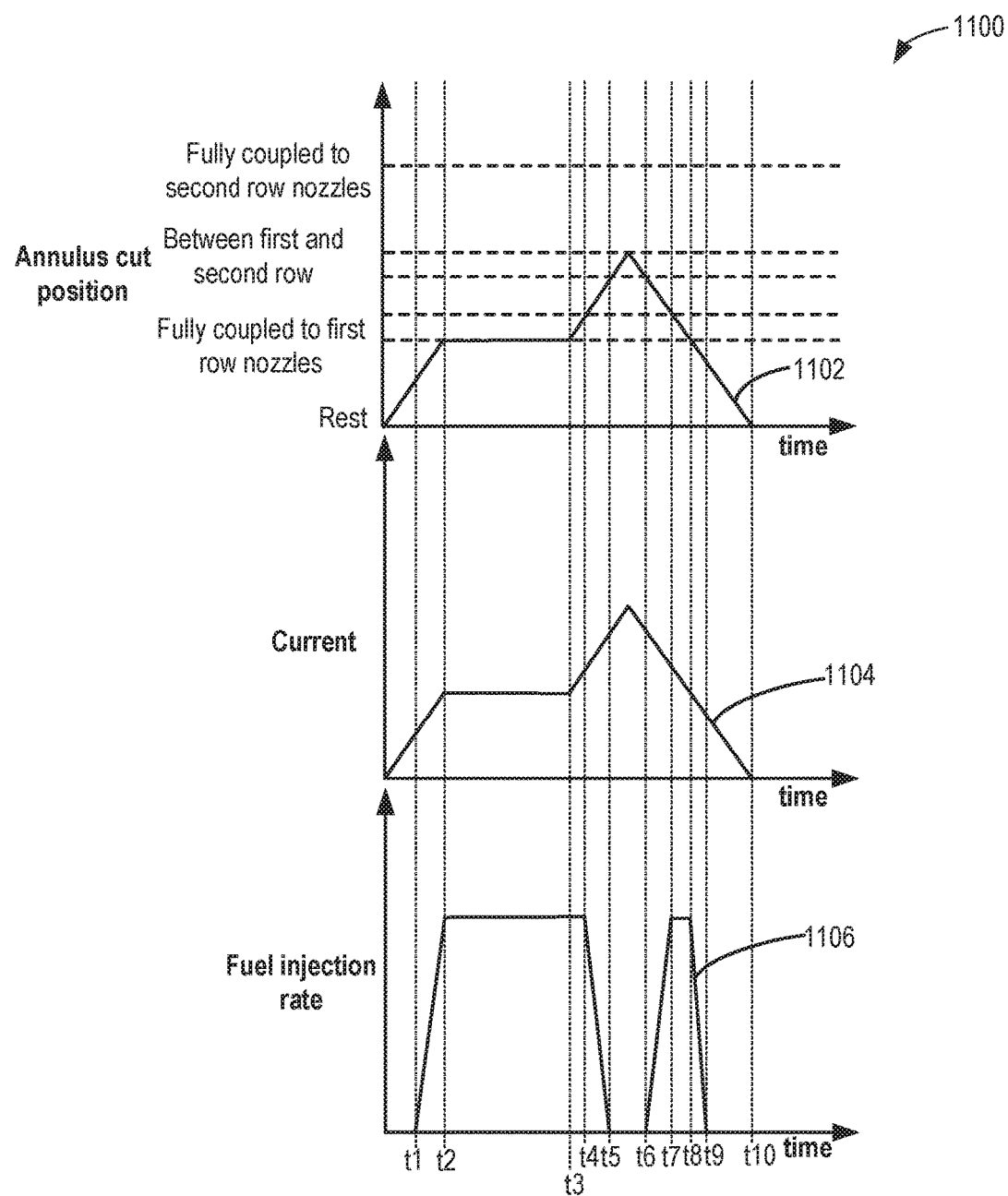
FIG. 11 shows an example operating sequence for performing a main and a post fuel injection according to the present disclosure.

The following description relates to systems and methods for adjusting the operation of a fuel injector assembly, which may be incorporated in an engine as shown in FIG. 1. An engine controller may send control signals to an electric actuator coupled to a needle of the fuel injector assembly to adjust the position of the needle, as shown in FIGS. 2-6. The controller may perform a control routine, such as the example routine of FIG. 6, to determine a fuel injection strategy (e.g., one, two, or three injections during a combustion cycle). In conjunction with the routine of FIG. 6, based on the fuel injection strategy, the controller may perform example routines of FIGS. 7, 9, and 12 to deliver one, two or three fuel injections per combustion cycle with a single actuation of the fuel injector assembly. Specifically, the controller may provide signals to an actuator of the injector assembly based on the routines described below. For example, when pilot, main, and post fuel injections are desired during a single combustion cycle, the actuator may be controlled to move the needle to a second position from a first (closed) position to provide a pilot fuel injection at the first position. Subsequently, the actuator may further move the needle to a third position and hold the needle at the third position to provide a main fuel injection, following which the actuator may move the needle back to the second position to deliver a post fuel injection before moving to the first position. An example single fuel injection by utilizing the fuel injection assembly is shown at FIG. 8. FIGS. 10 and 11 show examples of two fuel injections, and FIG. 13 shows an example where three fuel injections are performed during a single actuation of the fuel injector assembly.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Direct fuel injector 66 is shown positioned to inject fuel directly into cylinder 30, which is known to those skilled in the art as direct injection. Fuel injector 66 delivers liquid fuel in proportion to a voltage pulse width or fuel injector pulse width of a signal from controller 12. Fuel is delivered to fuel injector by a fuel system (not shown) including a fuel tank, fuel pump, and fuel rail (not shown). In addition, intake manifold 44 is shown communicating with optional electronic throttle 62 which adjusts a position of throttle plate 64 to control air flow from air intake 42 to intake manifold 44. Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a position sensor 154 coupled to brake pedal 150 for sensing force applied by foot 152, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle. Further, in some examples, other engine configurations may be employed, for example a diesel engine with multiple fuel injectors. Further, controller 12 may communicate conditions such as degradation of components to light, or alternatively, display panel 171.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g., when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

As explained above, a direct fuel injector 66 may be used to supply fuel directly to a cylinder of an engine, as shown in FIG. 1. Additionally or alternatively, a port fuel injector 67 may be used for delivering fuel into the intake manifold 44. As shown, fuel injectors 66 and 67 may receive signals from the controller 12 for controlling fuel injection during engine operation. Specifically, an injector actuator coupled to each of the fuel injectors 66 and 67 may receive electrical signals from the controller 12 based on a fuel injection strategy for delivering fuel. A fuel injector assembly described below with respect to FIGS. 2-5 may be configured as a direct fuel injector or a port fuel injector.

Figure 2:
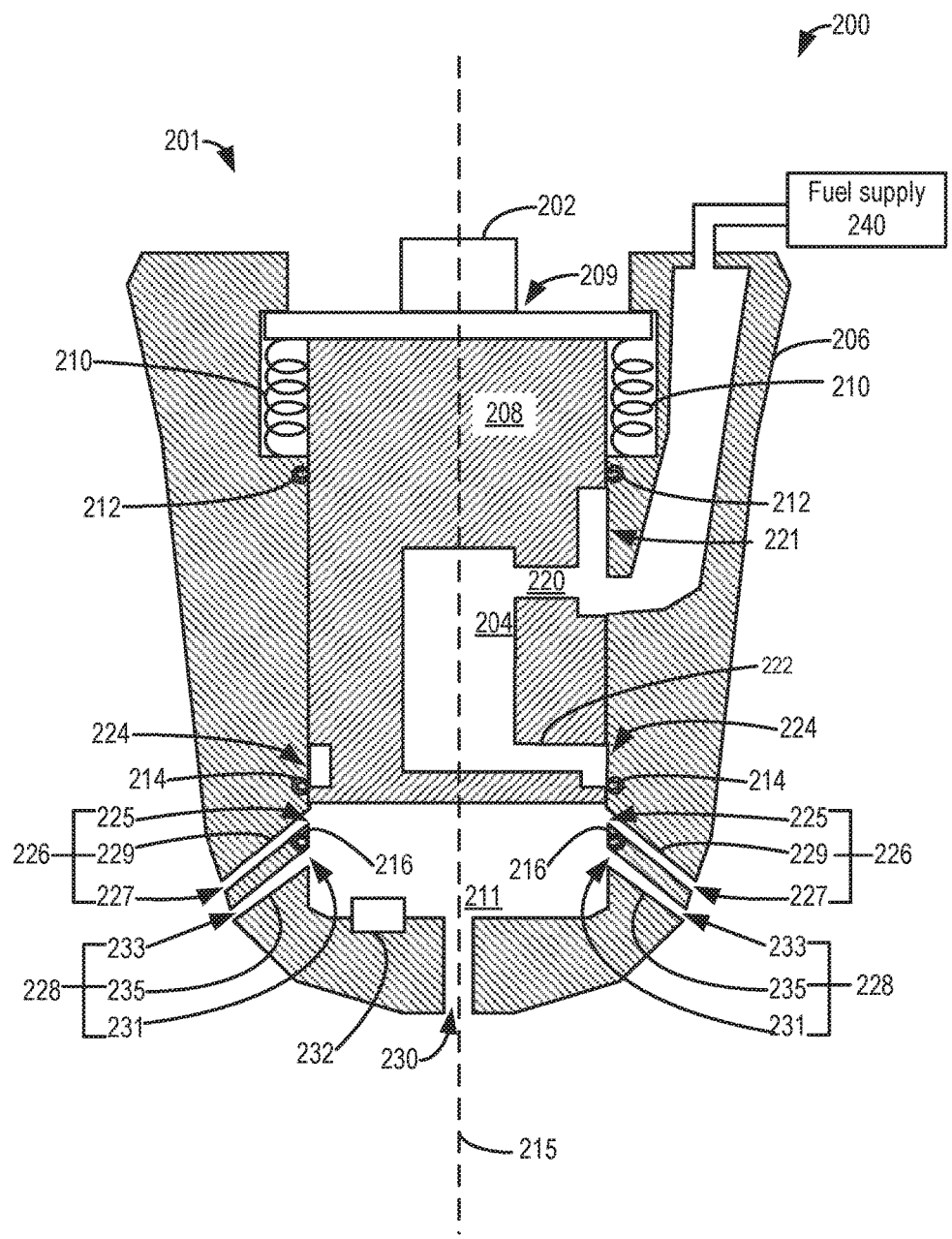
FIG. 2 shows an example of a fuel injector assembly used in the engine of FIG. 1 in a first position.

Referring to FIG. 2, an example of a fuel injector assembly 200, which may be utilized in an engine cylinder, such as cylinder 30 at FIG. 1, is illustrated. The fuel injector assembly 200 may be one non-limiting example of injector 66 of FIG. 1.

The fuel injector assembly 200 includes an injector body 206 housing an injector needle 208 within an interior chamber 211 of the injector body 206. The injector needle is movable along a longitudinal axis 215 of the injector body 206. In one example, the longitudinal axis 215 of the injector 206 may be perpendicular to a transverse axis 219 of a cylinder to which the fuel injector 200 delivers fuel. However, in other examples the injector may be positioned at a different angle relative to the transverse axis.

The fuel injector body 206 includes a plurality of nozzles 226 arranged in a first nozzle row and positioned in a lower portion of the fuel injector body 206. The plurality of nozzles 226 are used for delivering fuel from a fuel supply 240 (e.g., for delivering fuel to a cylinder). The fuel supply may be a high-pressure fuel supply line, for example. While the present example depicts two nozzles in the first nozzle row, it will be appreciated that any number of nozzles may be present in the first nozzle row. Each of the nozzles 226 of the first nozzle row comprise a first end 225 on an interior portion of the fuel injector body 206, a second end 227 on an external wall of the fuel injector body, and a first path 229 connecting the first end and the second end. The first end 225 is coupled to an interior chamber 211 of the fuel injector body 206. The second end 227 opens to the exterior of the fuel injector body and the second ends of each of the nozzles 226 lie along a first external circumferential path of the fuel injector body. Thus, each of the nozzles of the first nozzle row 226 couple the interior chamber 211 of the fuel injector body 206 to the exterior (outside) of the fuel injector body 206. Thus, if the fuel injector is positioned within a combustion chamber of the cylinder, the second end opens to the combustion chamber, and the first row of nozzles provide the first path for delivering fuel to the cylinder.

As indicated in the example illustrated at FIG. 2, the first path 229 may be sloping downwards. That is, the first end 225 of the nozzle may be positioned higher than the second end 227 of the nozzle. Specifically, the first end 225 that opens to the interior chamber 211 is positioned higher than the second end 227 that opens to the exterior of the fuel injector body. The exterior is an environment (e.g., combustion chamber or intake manifold) in which the fuel injector is placed. It will be appreciated that the slope of the first path 229 may vary (that is, the slope may be more or less) without departing from the scope of this disclosure. In some examples, the first and the second ends of the nozzle may be in level with each other along a transverse axis perpendicular to the longitudinal axis 215 of the injector.

The fuel injector body 206 further includes a plurality of nozzles 228 arranged in a second nozzle row and positioned vertically below the plurality of nozzles 226 of the first nozzle row. The second nozzle row comprising nozzles 228 and the first nozzle row comprising nozzles 226 may be separated by a distance. In other words, the nozzles 228 are positioned below the nozzles 226 along the longitudinal axis 215 of the injector body. The plurality of nozzles 228 are used for delivering fuel from the fuel supply 240 (e.g., for delivering fuel to a cylinder). Each of the nozzles 228 of the second row provide a second path 235 that fluidly couples the interior chamber 211 of the fuel injector body 206 to the exterior (that is, outside) of the fuel injector body 206. Specifically, a first end 231 of each of the nozzles 228 of the second row opens to the interior chamber 211 of the fuel injector body and a second end 233 of each of the nozzles 228 of the second row opens to the exterior of the fuel injector body. Thus, if the fuel injector is positioned within the combustion chamber, the second end opens to the combustion chamber, and the second row of nozzles provide the second path 235 for delivering fuel to the cylinder. Further, the second ends of each of the nozzles 228 lie along a second external circumferential path of the fuel injector body below the first external circumferential path.

As indicated in the example illustrated at FIG. 2, the second path 235 may be sloping downwards. That is, the first end 231 of each of the nozzles 228 of the second row may be positioned higher than the second end 233. Specifically, the first end 231 that opens to the interior chamber 211 is positioned higher than the second end 233 that opens to the exterior of the fuel injector body. As mentioned above, the exterior is an environment (e.g., combustion chamber or intake manifold) in which the fuel injector is placed. It will be appreciated that the slope of the second path 235 may vary (that is, the slope may be more or less) without departing from the scope of this disclosure. In some examples, the first end 231 and the second end 233 of the nozzles of the second row may be in level with each other along a transverse axis that is perpendicular to the longitudinal axis 215 of the injector.

Further, each of the nozzles 226 of the first row may be arranged in parallel with each of the nozzles 228 of the second row. That is, the slopes of the first path 229 and the second path 235 may be the same.

In one example, a first length (distance between a center of the first end 225 and the a center of the second end 226) of the first path 229 of each nozzle 226 may be greater than a second length (distance between the a center of the first end 231 and the a center of the second end 233) of the second path 235 of each nozzle 228. However, in some examples the first length and the second length may be substantially same. Further, in some examples, a volume of each of the nozzles 226 may be greater than a volume of each of the nozzles 228. In some other examples, the volume of each of the nozzles 226 may be substantially equal to the volume of each of the nozzles 228.

Further, in some examples, when three: or more nozzles are present in the first row, the nozzles 226 of the first row may be arranged substantially equidistant from each other. Similarly, the when three or more nozzles are present in the second row, nozzles 228 of the second row may be arranged substantially equidistant from each other. However, it will be appreciated that other arrangement of nozzles e.g., cluster arrangement) may be possible without departing from the scope of the disclosure.

The injector needle 208 includes a fuel passage 204. The fuel passage 204 is coupled to the fuel supply 240 (e.g., a high-pressure common fuel rail, fuel supply line(s), fuel pump(s), and fuel tank) via an upper flow path 220. The upper flow path 220 is coupled to an upper annular cut portion 221. The upper annular cut portion 221 provides fluidic communication between the fuel supply 240 and the fuel passage 204. The fuel passage 204 also includes a lower flow path 220 that is coupled to a lower annular cut portion 224 of the injector needle 208. The lower annular cut portion 224 provides an outlet for fuel discharge from the fuel passage 204 of the injector needle 208 to the first or second row nozzles during fuel delivery. Based on a displacement of the injector needle, the lower annular cut portion 224 may be coupled to either first row nozzles or second row nozzles. The annular cut portion 221 may remain coupled to the fuel supply 240 at all different positions of the injector needle 208.

One or more retention springs 210 may be included between the injector body 206 and the injector needle 208. Each retention spring 210 may act to bias the injector needle 208 in an upward direction (e.g., away from the nozzles towards an upper portion of the injector body) along the longitudinal axis 215 of the injector body 206. Specifically, the retention springs may act to maintain the injector needle in a closed position, wherein the lower annular cut portion 224 is above the first and the second row nozzles, and is not coupled to either the first row nozzles or the second row nozzles. In one example, one end of each of the retention springs 206 may be coupled to the injector body 206 within a groove and another end of each of the retention springs may be coupled to an upper portion 209 of the injector needle 208.

An actuator 202 may be coupled to the injector needle 205. The actuator 202 may be used to move the needle to regulate fuel injection. Specifically, the actuator 202 may move the needle 208 along the longitudinal axis 215 in a downward direction (e.g., toward the nozzles), against the force of the springs. The actuator 202 may receive an electrical signal from a controller, such as controller 12 at FIG. 1. The electrical signal to the actuator may be based on the fuel injection mode (single, double or multiple fuel injections, for example), a desired fuel injection amount, fuel injection timing, rail pressure, etc. Responsive to the electrical signal, the actuator may move the injector needle 208 to regulate fuel injection.

The injector body 206 further includes a first sealing ring 212, a second sealing ring 214, and a third sealing ring 216 to prevent fuel leakage across the injector needle and across the nozzles of the fuel injector body. Specifically, the first sealing ring 212 may be positioned below the retention spring 210 and above the upper annular cut portion 221. The first sealing ring 212 hermetically seals the fuel from the fuel passage 204 from leaking into a cavity between the fuel injector body and the fuel injector needle where the retention spring is located. The second sealing ring 214 is positioned below the first sealing ring 212 and above the first row nozzles 226. The second sealing ring 214 provides hermetic sealing between the lower annulus cut portion 224 and the injector body. Consequently, leaking or dripping of fuel from the fuel passage 204 via the annulus cut portion is reduced. Specifically, when the injector is closed (that is, when the actuator is not activated), leaking or dripping of fuel from the fuel passage 204 is reduced. The third sealing ring 216 is located between the first row nozzles 226 and the second row nozzles 228. The third sealing ring 216 hermetically seals the nozzles of the first row and the nozzles of the second row. Specifically, during fuel delivery through the first or second row of nozzles, the third seal 216 reduces leakage via the lower annulus cut 224 between the nozzles of the first row and the nozzles of the second row. In some examples, the first sealing ring may be located at any location above the second sealing ring 214.

An opening 230 is provided at the bottom of the fuel injector body 206 to release air pressure from the interior chamber 211 when the fuel injector needle 208 moves up and down by the force of the actuator 202. Further, fuel injector body 206 includes a spring stopper 232 for preventing the fuel injector needle 208 from hitting an interior bottom surface of the fuel injector body when electric force is supplied to the injector needle.

FIG. 2 shows the fuel injector assembly 200 in a first position 201 wherein actuator 202 is not activated. When the actuator is not activated (that is, mechanical or electrical force provided by the actuator is turned off), an upward force provided by the springs bias the needle upward into face-sharing contact with an inner wall of the injector body. In other words, when the actuator is not activated the upward spring forces move the injector needle upwards until the fuel injector needle is stopped by the inner wall of the injector body. When the fuel injector assembly is at the first position, the lower annular cur portion 224 of the injector needle is positioned above the first and the second row and is not coupled either to nozzles 226 of the first row or to nozzles 228 of the second row. As a result, the fuel supply 240 is decoupled from the injector nozzles. However, as shown, the upper annular cut portion 221 is fluidically coupled to the fuel supply 240. Consequently, fuel is blocked from exiting the fuel passage 204 and no fuel injection occurs.

Figure 3:
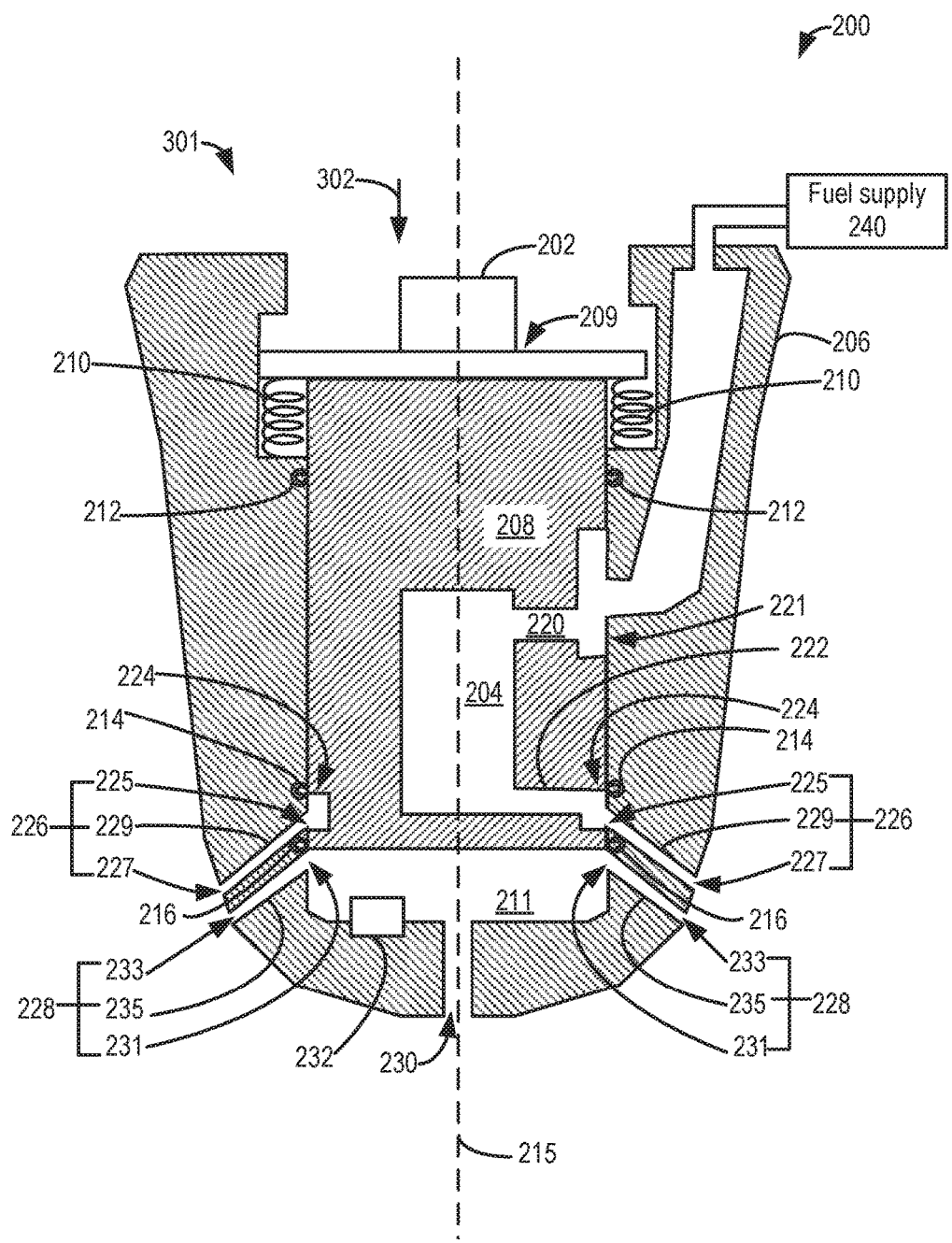
FIG. 3 shows an example of the fuel injector assembly in a second position.

FIG. 3 shows the fuel injector assembly 200 in a second position 301. For example, fuel injector needle 208 may be adjusted to the second position from the first position by activation of the actuator 202. Specifically, the actuator 202 may be activated to provide a first amount of force. In response to the activation, the actuator forces the needle 208 downward towards the nozzles against the force of the springs. The first amount of force pushes the needle 208 downward to couple the fuel supply line 240 to the nozzles 226 of the first row via lower annular cut 224. In other words, responsive to activation of the actuator, the first amount of force moves the fuel injector needle 208 in a downward direction for a first distance along the longitudinal axis 215, which results in fluidic coupling between the fuel passage 204 and the nozzles 226 via lower annular cut 224. Thus, in the second position 301, the first row of nozzles 226 are coupled to the fuel supply 240 via the fuel passage 204 and lower annulus cut portion 224. As the fuel supply 240 is coupled to the first row of nozzles, fuel is delivered via the first row of nozzles 226.

As the injector needle moves downwards, the upper annular cut portion 221 remains coupled to the fuel supply 240 via different portions of the upper annular cut portion 221. For example, a first portion of upper annular cut 221 may be coupled to the fuel supply 240 when the needle 208 is at the first position 201. As the injector needle 208 moves down, a second portion of the upper annular cut 221 may be coupled to the fuel supply 240. The second portion may be different from the first portion. In some examples, the second portion may partially overlap with the first portion. Further, it must be noted that as the injector needle 208 moves down, there is no movement or change in size for any part of the injector body 206. Direction of movement of needle 208 from the first position (201 at FIG. 2) to the second position (301) responsive to the force provided by the actuator is indicated at 302. The actuator may be activated when an electrical input, such as current, is supplied to the actuator. The electrical input may be variable.

Further, when operating in the second position, sealing ring 214 reduces leakage of fuel from the fuel passage to a cavity between the fuel injector needle and the fuel injector body; and sealing ring 216 reduces fuel leakage of fuel from the fuel passage to the second row of nozzles 228. In other words, in the second position 301, sealing ring 214 reduces leakage between the injector needle 208 and the injector body 206 via the lower annular cut 224. Further, sealing ring 216 hermetically seals the first and the second row nozzles, thereby reducing leakage of fuel from the fuel passage 204 into the second row nozzles 228 when the fuel injector needle is coupled with the first row nozzles 226.

Figure 4:
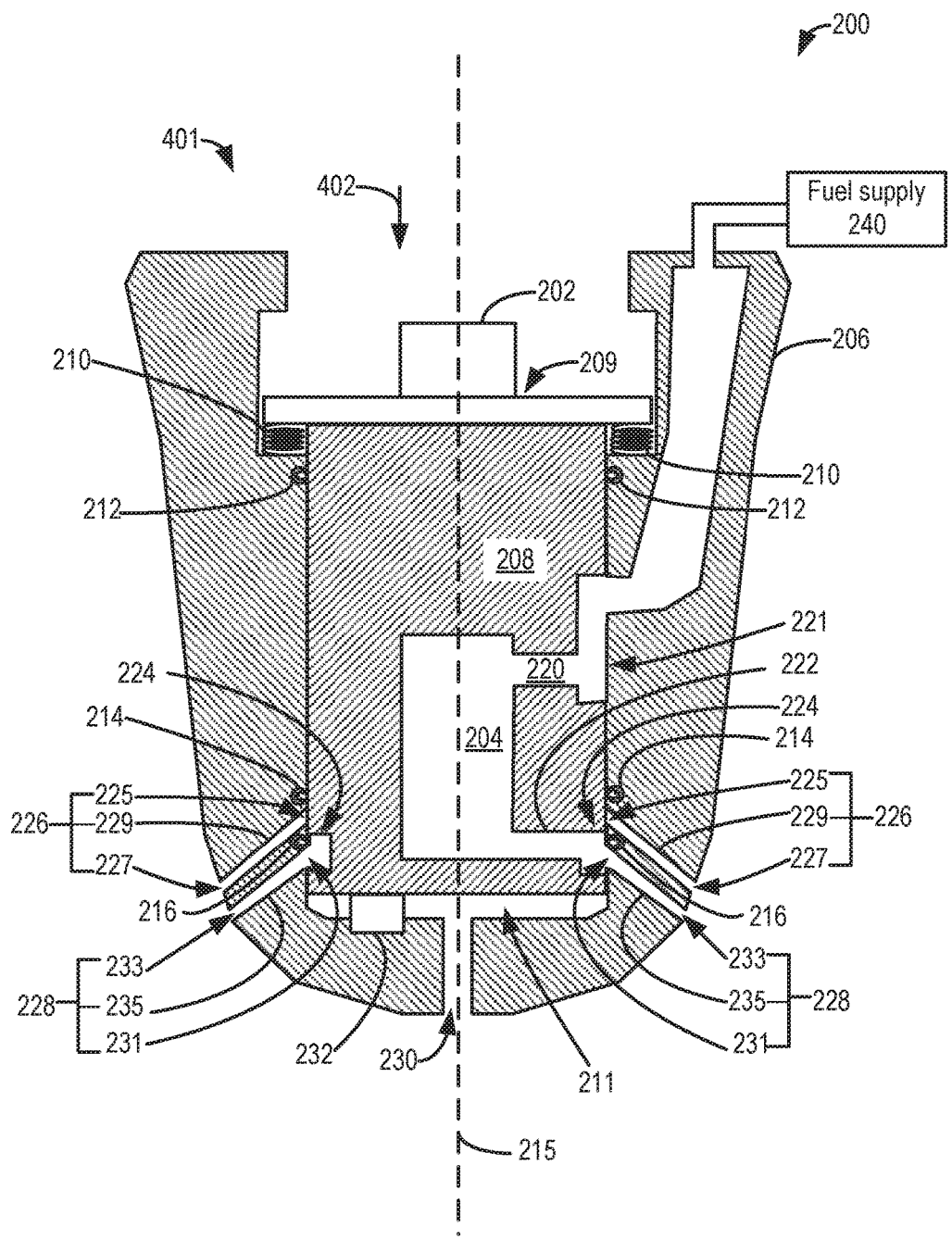
FIG. 4 shows an example of the fuel injector assembly in a third position.

FIG. 4 shows the fuel injector assembly 200 in a third position 401. For example, fuel injector needle 208 may be adjusted to the third position from the second position the actuator 202. Specifically, a second amount of force may be provided by the actuator to move the fuel injector needle further in the downward direction against the force of the springs to conduct a second fuel injection via the nozzles 228 of the second row. Thus, as the fuel injector needle 208 moves downwards, the annulus cut portion is decoupled from the first row of nozzles 226 and coupled to the second row of nozzles 228. When the fuel injector assembly is in the third position, fuel from the fuel supply 240 is delivered to the cylinder via fuel passage 204 and the second row of nozzles 228. Direction of movement of needle 208 from the second position (301 at FIG. 2) to the third position (401) responsive to the force provided by the actuator is indicated at 402.

Further, as the injector needle moves downwards, the upper annular cut portion 221 remains coupled to the fuel supply 240 via different portions of the upper annular cut portion 221. For example, as the injector needle 208 moves down, a third portion of the upper annular cut 221 may be coupled to the fuel supply 240. The third portion may be different from the second portion of upper annular cut 221 that is coupled when the needle 208 is at second position 301. In some examples, the third portion may partially overlap with the second and/or the first portion, where the first portion of upper annular cut 221 is the portion coupled to the fuel supply 240 when the needle 208 is at the first position 201.

Figure 5:
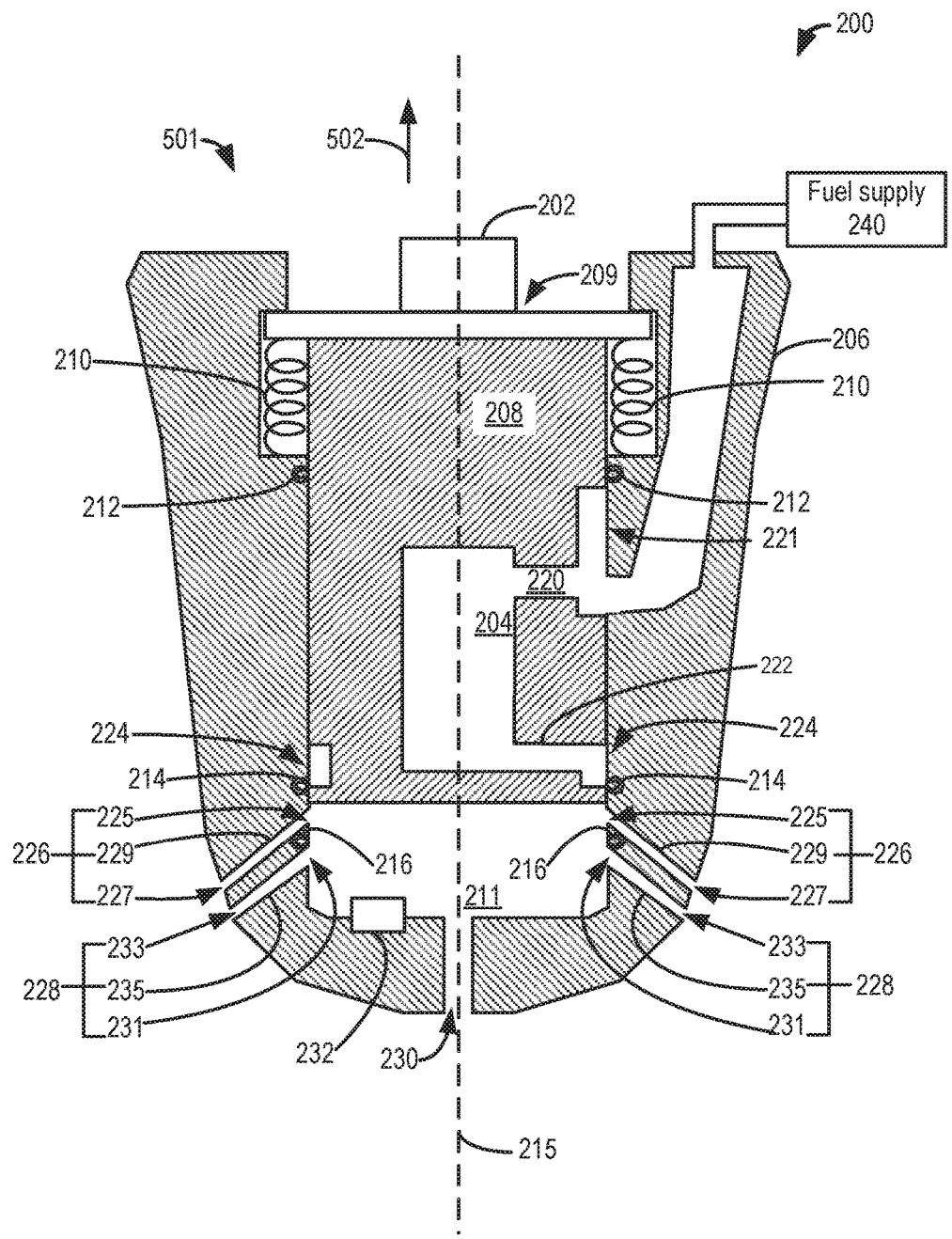
FIG. 5 shows an example of the fuel injector assembly in a fourth position.

FIG. 5 shows the fuel injector assembly 200 in a fourth position 501. The fuel injector assembly 200 may be adjusted to the fourth position from the third position when the actuator is deactivated. Specifically, when the fuel injector assembly 200 is in third position, responsive to actuator deactivation, springs 210 act to move the fuel injector needle 208 in the upward direction. As the fuel injector needle 208 is drawn upwards by the springs 210, the lower annulus cut portion 224 is decoupled from the nozzles 228 of the second row and coupled to the nozzles 226 of the first row, and then subsequently decoupled from the nozzles 226 before reaching the fourth position. Fourth position is similar to the first position. Thus, when the fuel injector assembly is in the fourth position, the fuel supply 240 is decoupled from nozzles 226 and nozzles 228. Hence, no fuel injection is conducted. Direction of movement of needle 208 from the third position (401 at FIG. 2) to the fourth position (501) is indicated at 502.

In one example, when a pilot, a main, and a post fuel injection is desired during a single combustion cycle, the actuator may move the injector needle downward from the first position to the third position via the second position. As the injector moves downwards, at the second position, a pilot fuel injection may be delivered via the first row of nozzles. When the injector needle reaches the third position, the third position may be maintained for a desired duration to provide a main fuel injection via the second row of nozzles. Subsequently, after providing a desired fuel injection amount for the main fuel injection, the actuator may move the injector upwards from the third position to the fourth position via the second position. As the injector moves upwards, at the second position, post fuel injection may be delivered via the first row of nozzles. In this way, during a single actuation cycle comprising a movement of the needle from the first position to the third position via the second position and subsequently from the third position to the fourth position via the second position, the pilot, the main and the post fuel injection may be performed. Based on the force provided by the actuator (the force based on the current supplied to the actuator), and a duration spent in each of the second and third positions, the fuel injection rates and amounts may be adjusted.

In another example, when two fuel injections are desired, such as a pilot and a main fuel injection or a main and a post fuel injection, the actuator may move the injector needle downward from the first position via the second position to an intermediate position between the first and the second row nozzles, where the annular cut portion is not coupled to either first or second row of nozzles. As the annular cut portion passes through the first row of nozzles to reach the intermediate position, a first fuel injection may be performed at the second position via the first row of nozzles. Subsequently, the actuator may move the injector needle upwards from the intermediate position to the first or the fourth position via the second position, and second fuel injection may be delivered at the second position as the needle moves upwards.

In yet another example, when one fuel injection is desired, the actuator may move the needle to the second position and a single fuel injection may be delivered at the second position via the first row of nozzles. After a desired amount of fuel is delivered, the actuator may move the injector back to the first position or fourth position. As discussed above, the first position may be the same as the fourth position.

Figure 6:
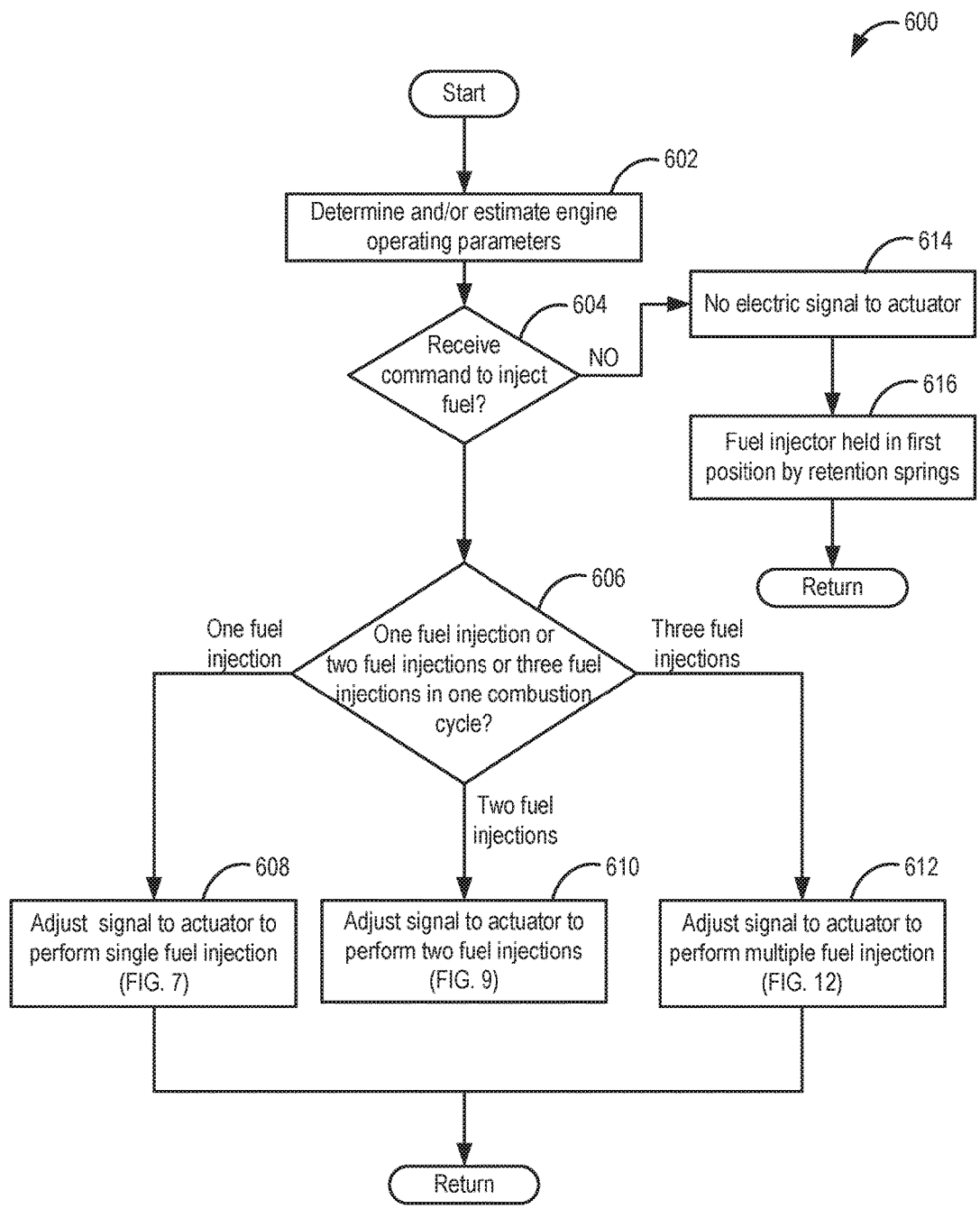
FIG. 6 depicts a high-level flow chart illustrating an example method for operating a fuel injector assembly.

Turning to FIG. 6, a flow chart illustrating an example method 600 for operating a fuel injector assembly, such as fuel injector assembly 200 at FIGS. 2-5, is shown. At least portions of method 600 may be implemented as executable controller instructions stored in non-transitory memory. Additionally, portions of method 600 may be actions taken in the physical world to transform an operating state of an actuator or device, such as the actuator 202 of the fuel injector assembly. Instructions for carrying out method 600 may be executed by a controller (e.g., controller 12) based on instructions stored on a memory of the controller and in conjunction with signals received from sensors of the engine system, such as the sensors described above with reference to FIG. 1. The controller may employ engine actuators of the engine system, such as actuator 202 at FIGS. 2-5, to adjust engine operation, according to the method described below.

Method 600 starts at 602. At 602, method 600 includes determining and/or estimating engine operating parameters. The engine operating parameters may include but are not limited to engine status (e.g., on or off), engine speed, engine torque demand, indicated engine torque, engine position, and engine temperature. After determining engine operating parameters, method 600 proceeds to 604.

At 604, method 600 includes determining if a command to inject fuel is received. Fuel may be injected to the engine when the engine is rotating and when engine operation is desired by the operator or by a controller. As an example, fuel may be injected in response to engine load above a threshold and/or in response to the firing order and engine position indicating that the injector is to inject fuel to initiate combustion in the cylinder. If the command to inject fuel is yes, method 600 proceeds to 606.

At 606, method 600 includes confirming a fuel injection mode (single, double or multiple fuel injections) based on engine operating conditions. That is, the controller may confirm if a single fuel injection, a double fuel injection, or multiple fuel injections are desired for operating the engine. For example, single fuel injection may be performed during one or more engine operating conditions including engine idle control, exhaust catalyst temperature above a threshold, engine temperature above a threshold, and during engine hot-start conditions. Accordingly, based on engine operating conditions, if a single fuel injection is desired, method 600 proceeds to 608. At 608, method 600 includes adjusting an electrical signal to an actuator, such as actuator 202 of fuel injection assembly 200 shown at FIG. 2, to perform a single fuel injection. Details of performing a single fuel injection by utilizing a fuel injector assembly, such as fuel injector assembly 200 at FIG. 2, will be further elaborated with respect to FIGS. 7 and 8.

Double fuel injection may be a split fuel injection, wherein the fuel is delivered in a pilot injection and a main fuel injection, or a main fuel injection and a post fuel injection during a single combustion cycle. As such, a pilot injection is performed prior to a main injection, whereas post injection is performed after the main injection. Typically, diesel engines perform a pilot injection in advance to the main injection in order to reduce combustion noise and emissions. In engine systems that utilize particulate filters coupled within an exhaust passage, post fuel injection following a main fuel injection may be performed for generating heat to increase a temperature of the particulate filter for regeneration.

Further, in turbocharged engine systems, post fuel injection following the main fuel injection may be utilized for reducing turbo lag. For example, if a torque demand increase is greater than a threshold, a second (post) fuel injection may be performed after a first (main) fuel injection to reduce the time required to increase turbine speed to a desired speed. Further, in some examples, post fuel injection may be performed during cold start conditions, wherein the additional exhaust energy generated may be partly utilized to reduce the duration to bring a temperature of an emission control device to a threshold temperature, thereby improving catalyst light-off.

Still further, post fuel injection may be performed to maintain the temperature of the emission control device above a threshold, such as in a variable displacement engines (VDE) during operating one or more cylinders in a deactivated state, for example. Further, split fuel injection comprising a main fuel injection and a post fuel injection may be utilized for EGR tolerance during low load conditions, for example. Specifically, during a transition from operating the engine at a higher load to very low loads, such as during a tip-out operation, while EGR is purged from the intake system, the engine may be transiently operated with split fuel injection. Thus, based on engine operating conditions, if two fuel injections (pilot and main or main and post) are desired, method 600 proceeds to 610. At 610, method 600 includes adjusting the electrical signal to the fuel injector actuator to perform two fuel injections during a single combustion cycle. Details of performing double fuel injection will be further elaborated with respect to FIGS. 9, 10 and 11.

Multiple fuel injections may include performing a pilot fuel injection, a main fuel injection, and a post fuel injection during a single combustion cycle. During some engine operating conditions, it may be desirable to perform a pilot injection to reduce engine noise and enhance combustion, a main injection for delivering desired torque, and a post injection for regeneration or increasing temperature of one or more exhaust after-treatment devices (e.g., particulate filters, three-way catalyst). Accordingly, if three fuel injections (e.g., pilot, main, and post) are desired during a single combustion event, method 600 proceeds to 612. At 612, method 600 includes adjusting the electrical signal to the fuel injector actuator to perform three fuel injections during a single combustion cycle. Details of performing three fuel injections during a single combustion event will be further elaborated with respect to FIGS. 12 and 13.

Returning to 604, if it is determined that no command to inject fuel is received, no signal is sent to the actuator, as indicated at 614. At 614, the injector is held or moved upward by the retention springs, such as retention springs 210 at FIGS. 2-5, such that the injector needle, such as injector needle 208 at FIGS. 2-5, is held in a first position, resulting in a closed fuel passage, and thus no fuel injection.

Figure 7:
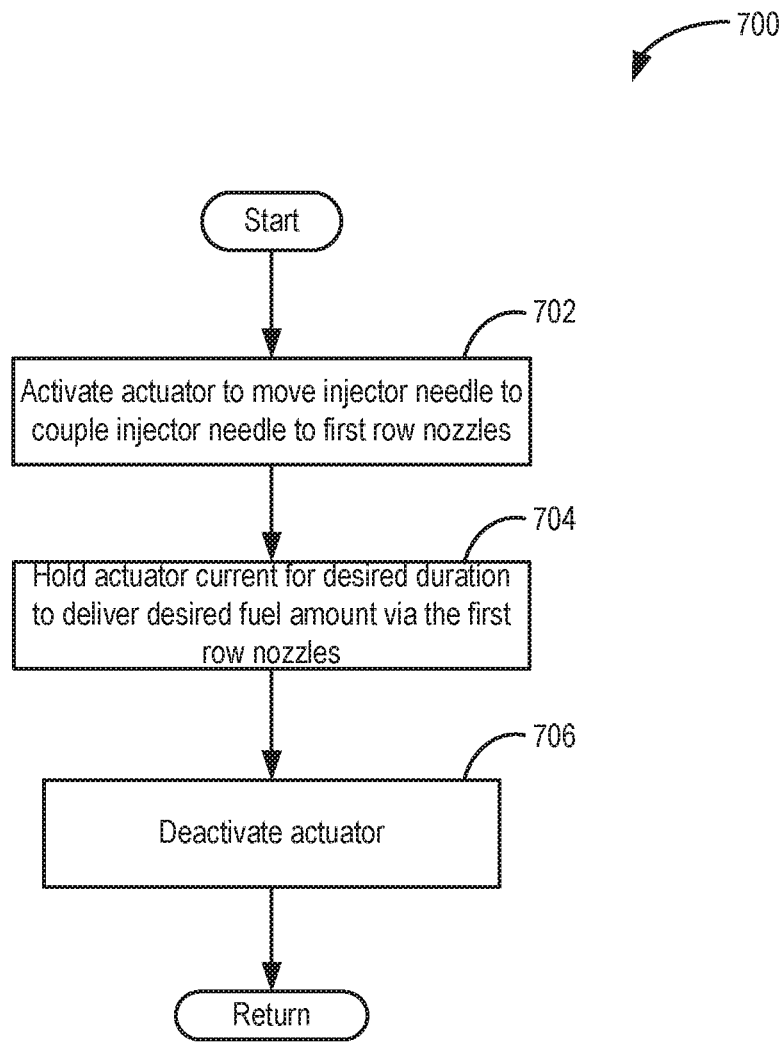
FIG. 7 depicts a flow chart illustrating an example method for performing a single fuel injection during a single combustion cycle.
Figure 8:
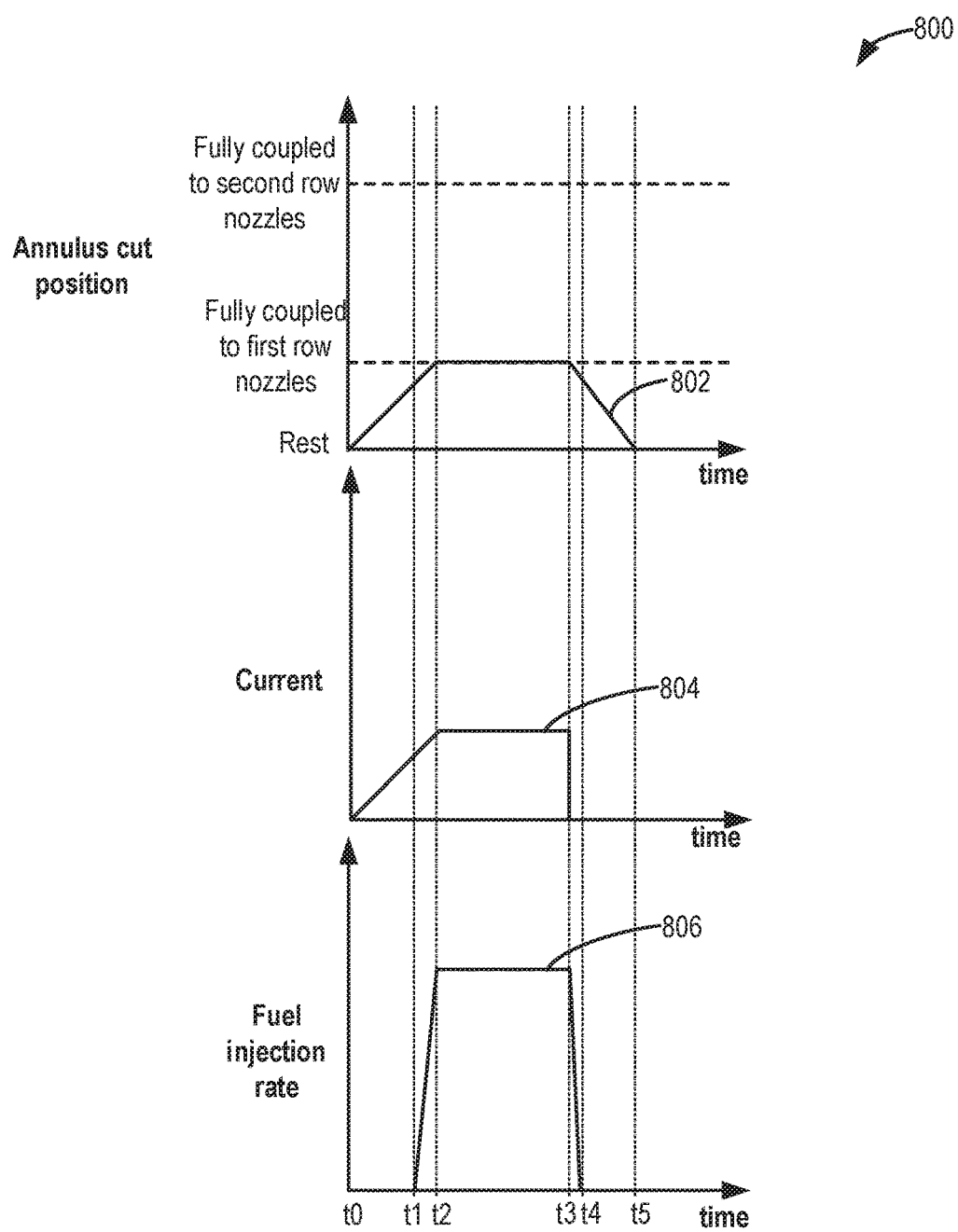
FIG. 8 shows an example operating sequence for performing a single fuel injection according to the present disclosure.

FIG. 7 illustrates an example method 700 for delivering a single fuel injection during a single combustion cycle. The single fuel injection may be delivered by utilizing a fuel injector assembly, such as fuel injector assembly 200 shown at FIGS. 2-5. Specifically, the method illustrates control of a fuel injector actuator, such as actuator 202 at FIG. 2, for delivering a single main fuel injection. The fuel injector assembly may be utilized for direct or port fuel injection depending on positioning of the fuel injector within an engine cylinder or an intake manifold. Accordingly, when the fuel injector assembly is utilized for direct fuel injection, fuel from a fuel supply, such as fuel supply 240 at FIGS. 2-4, may be delivered to a combustion chamber, such as combustion chamber 30 at FIG. 1, of the engine cylinder. When the fuel injector assembly is utilized for port fuel injection, fuel from the fuel supply may be delivered to the intake manifold.

Method 700 begins at 702. At 702, method 700 includes activating the fuel injector actuator to move the fuel injector needle to fluidically couple the fuel supply to a first row of nozzles, such as nozzles 226 at FIGS. 2-5. In this example, it may be assumed that prior to activation, the fuel injector assembly is initially is a closed state, where no signal is supplied to the actuator and the fuel injector needle is decoupled from the first and the second row nozzles. When operating in the closed state, the fuel injector assembly may be in a first position, such as the first position 201 shown in FIG. 2. Therefore, activating the fuel injector actuator includes providing a signal to the fuel injector actuator. The signal may be an electrical signal, such as a current. For example, a controller may determine a desired current to the actuator to move the injector needle downwards towards the first row of nozzles to couple an annulus cut portion, such as lower annulus cut portion 224 indicated at FIGS. 2-5, of the fuel injector needle to first row nozzles of the fuel injector based on engine operating parameters. The controller may then supply the desired current to the fuel injector actuator. As the force provided by the actuator is greater than the force provided by the return springs and acts in direction opposite to return spring force, responsive to the signal provided by the controller, the fuel injector actuator pushes the fuel injector needle in a downward direction along a longitudinal axis of the fuel injector assembly. The desired current may be a variable current to provide desired force for a designated travel distance of the injector needle.

Next, at 704, method 700 includes providing a holding current for a desired duration. Specifically, the holding current may be provided when the first row nozzles are fully coupled to the annulus cut portion of the fuel injector needle. The holding current may be a constant current and may be provided to maintain the fluidic coupling between the fuel supply and the first row nozzles for the desired duration. The desired duration may be based on a desired fuel injection amount, for example. Accordingly, if a larger amount of fuel injection is desired, the desired duration of providing the holding current may be greater. As such, the desired fuel injection amount, or fuel demand may be based on a pedal position (pp), engine speed (N), and measured mass air flow (MAF). Note that this fuel injection amount can also be determined based on other parameters. For example, a two-dimensional map of engine speed and pedal position can be used. Alternatively, a two-dimensional map of pedal position and vehicle speed can also be used.

Upon delivering the desired fuel injection amount via the first row nozzles, method 700 proceeds to 706. At 706, the fuel injector actuator may be deactivated. Deactivating the fuel injector actuator includes stopping providing signal to the actuator. In the absence of an electric signal to the electric actuator, the plurality of retention springs coupled to the injector body and the injector needle push the needle upward along the longitudinal axis, away from the nozzles. Thus, the retention springs act to move the needle upwards to the first position and hold the needle in the first position. Additionally, the upward movement of the needle may be also stopped by an upper portion of the fuel injector body, as illustrated above at FIG. 2.

In this way, the fuel injector assembly may be utilized to deliver a single main fuel injection via the first row of nozzles. An example fuel injection is shown at FIG. 8.

Referring now to FIG. 8, a sequence 800 for a single main fuel injection is shown. The sequence of FIG. 8 may be provided by the system of FIGS. 1-5 by utilizing the method of FIG. 7 in conjunction with the method of FIG. 6.

The first plot from the top of FIG. 8 shows a position of an annulus cut portion, such as lower annulus cut portion 224 at FIGS. 2-5, of a fuel injector assembly versus time. Trace 802 indicates change in the position, and the annulus cut portion moves in a downward direction, such as direction 302 at FIG. 3, along a longitudinal axis of the fuel injector in the direction of Y-axis arrow. In other words, the Y-axis arrow indicates a movement of the annulus cut portion of the fuel injector needle (and hence the fuel injector needle) in the downward direction.

The second plot from the top of FIG. 8 shows current supplied to the actuator versus time. Trace 804 represents change in current over time, and the current increases in the direction of the Y-axis arrow.

The third plot from the top of FIG. 8 shows fuel injection rate versus time. Trace 806 represents change in fuel injection rate over time, and the fuel injection rate increases in the direction of the Y-axis arrow.

All plots show time increasing along the direction of the X-axis arrow.

At time t0, the fuel injector is in a deactivated or rest state. In the deactivated state, the fuel injector needle is held in a closed position by the force of the retention springs. In the closed position, the annulus cut portion of the fuel injector is above the first row nozzles and the second row nozzles, and therefore, the annulus cut portion is not coupled to either first or second row nozzles. Thus, fuel supply 240 is decoupled from the nozzles and fuel delivery does not take place.

Between times t0 and t1, an electric signal (that is, current) is supplied to an actuator. As a result, the fuel injector needle moves in a downward direction along a longitudinal axis of the injector. As the current increases, the injector needle moves further downwards from the rest position towards the first row nozzles. At t1, the annulus cut portion of the fuel injector needle starts coupling to the first row nozzles. That is, at t1, a portion of the annulus cut portion is coupled to a portion of each of the first row nozzles. Thus, at t1, fuel injection begins and fuel in injected into the environment in which the fuel injector is position. That is, in case of direct fuel injection, fuel is injected into the engine cylinder and in case of port fuel injection; fuel is injected into the intake manifold.

Between t1 and t2, as the current to the actuator is increased, the injector needle is further pushed downwards and the region of coupling between the annulus cut portion and the first row nozzles increases. According fuel injection rate increases.

At t2, the annulus cut portion is fully coupled to the first row nozzles. Between t2 and t3, a constant holding current is supplied to the actuator. As a result, the annulus cut portion of the fuel injector needle remains fully coupled to the first row nozzles between time t2 and t3, and the fuel is delivered at a constant fuel injection rate via the first row nozzles.

At t3, current supply to the actuator is terminated. As a result, the fuel injector needle moves in an upwards direction, such as direction 502 indicated at FIG. 5, away from the first row of nozzles along the longitudinal axis of the fuel injector by the force of the retention springs.

As the fuel injector needle moves upwards, between t3 and t4, region of coupling between the annulus cut portion of the fuel injector and the first row nozzle decreases. Hence, the fuel injection rate decreases.

At t4, the annulus cut portion of the fuel injector needle is fully decoupled from the first row nozzles. Consequently, fuel injection is terminated. After t4 and between t4 and t5, the fuel injector needle continues to move upwards by the forces of the retention springs. At t5, the fuel injector needle comes to the rest position and movement of the fuel injector needle stops. At t5 and beyond, the fuel injector needle is held in rest position by the retention springs. Additionally, an upper portion of the fuel injector body may prevent further movement of the injector in the upward direction.

In this way, single main fuel injection may be performed.

Figure 9:
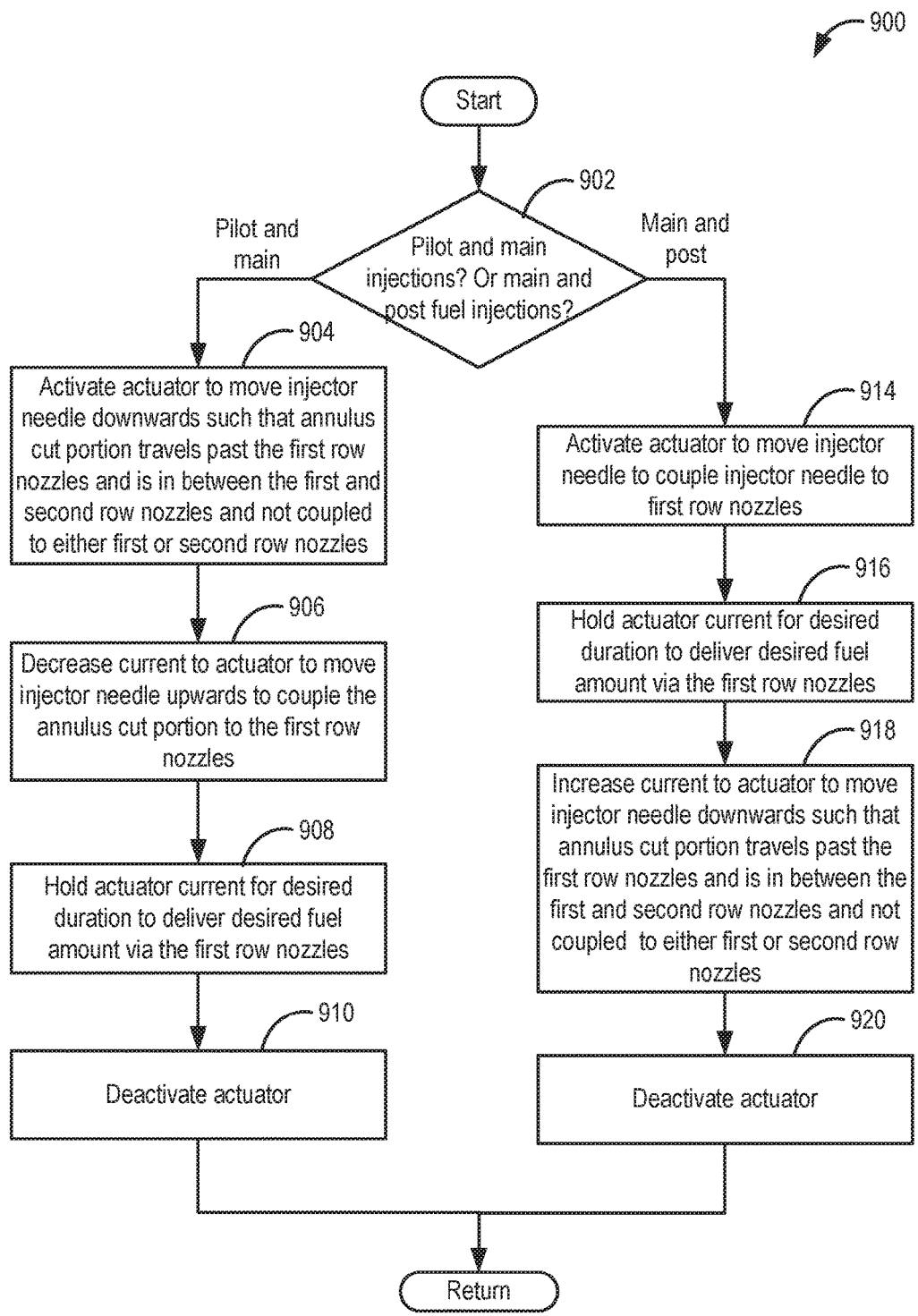
FIG. 9 is a flow chart illustrating an example method for performing two fuel injections during a single combustion cycle.

Turning to FIG. 9, an example method 900 for delivering two fuel injections by utilizing a fuel injector assembly, such as fuel injector assembly 200 shown at FIGS. 2-5, is described. The fuel injections may be performed during a single combustion cycle with a single actuation of a fuel injector actuator, such as actuator 202 at FIG. 2. Specifically, the method illustrates control of a fuel injector actuator, such as actuator 202 at FIG. 2, for delivering a pilot and a main, or a main and a post fuel injection.

Method 900 begins at 902. At 902, method 900 includes confirming if a pilot and main or a main and a post fuel injection is to be performed based on engine operating conditions. If pilot and main fuel injections are desired, method 900 proceeds to 904.

At 904, method includes activating the actuator to move the injector needle downwards against the force of the retention springs such that the annulus cut portion of the fuel injector needle travels past the first row and is suspended in an intermediate position between the first and second row nozzle without being coupled to either first or second row nozzles. The actuator may be activated by supplying an electric signal, such as a current. The current supplied for activating the actuator may be a linearly variable current that increases linearly with time to provide sufficient force for the injector needle to travel downwards against the force of the retention springs. In this example, it may be assumed that prior to activation, the fuel injector assembly is initially is a closed state, where no signal is supplied to the actuator and the annulus cut portion of the fuel injector needle is decoupled from the first and the second row nozzles and is positioned above the first and the second row nozzles. When operating in the closed state, the fuel injector assembly may be in a first position, such as the first position 201 shown in FIG. 2. The desired current and the desired duration of the desired current may be based on the desired travel distance of the injector. In this example, when a pilot and main fuel injections are desired, desired current and desired duration may be based on a force required to push the injector beyond the first nozzle row yet remain above the second nozzle row and without the annulus cut portion being coupled to either first or second row.

Accordingly, as the desired current is supplied for the desired duration, the injector needle moves downwards. As it travels downwards, the annulus cut portion is coupled to the first row nozzle and subsequently decoupled before reaching the intermediate position in between the first and the second row nozzles. During the period when the annulus cut portion is coupled (the coupling may be initially partial, followed by full coupling, and subsequently partial coupling before fully decoupling from the first row nozzles), fuel may be delivered via the first row nozzles. Thus, pilot fuel injection is delivered via the first row nozzles as the fuel injector travels past the first row nozzles.

After reaching the intermediate position, where the annulus cut portion of the fuel injector is between the first and the second row nozzles and not coupled to either first or second row nozzles, method 900 proceeds to 906. At 906, method 900 includes decreasing current supplied to the actuator in order to move the injector needle upwards until the annulus cut portion is fully coupled to the first row nozzles.

Next, after the annulus cut portion is fully coupled to the first row nozzles, at 908, method 900 includes supplying a constant holding current to maintain full coupling with the first row nozzles for a desired duration to deliver a main fuel injection via the first row nozzles.

Upon maintaining the coupling with the first row nozzles for the desired duration, method 900 proceeds to 910. At 910, method 900 includes deactivating the fuel injector actuator. In one example, as illustrated at FIG. 10, deactivating the fuel injector actuator includes gradually decreasing the electric signal supplied to the actuator. For example, when current is utilized to activate and deactivate the actuator, the current may be decreased from the holding current to zero current gradually over a period of time. As the current is decreased, the force provided by the actuator is decreased and the fuel injector needle moves upwards along the longitudinal axis of the needle by the force of the retention springs. As a result, as the injector needle moves upwards, the annulus cut portion of the fuel injector needle is decoupled from the first row nozzles, thereby ending the main fuel injection. Finally, when the actuator current is decreased to zero, the fuel injector needle is held closed in the first position by the retention springs and further upward movement may be stopped by the upper portion of the fuel injector body.

In one example, deactivating the fuel injector actuator includes stopping the electric signal to the actuator. As discussed above, in the absence of an electric signal to the electric actuator, the plurality of retention springs coupled to the injector body and the injector needle push the needle upward along the longitudinal axis, away from the nozzles. Thus, the retention springs act to move the needle to the first position and hold the needle in the first position. Additionally, the upward movement of the needle may be also stopped by an upper portion of the fuel injector body, as illustrated above at FIG. 2.

In this way, the fuel injector assembly may be utilized to deliver two fuel injections including a pilot and a main fuel injection via the first row of nozzles through a single actuation cycle (activation, holding, and deactivation) of the actuator. An example of a fuel injection sequence wherein the fuel injector assembly is utilized to deliver a pilot and a main fuel injection during a single actuation cycle of the fuel injector is shown in the sequence of FIG. 10.

Referring now to FIG. 10, a sequence 1000 for performing two fuel injections including a pilot and a main fuel injection during a single combustion cycle through a single actuation cycle of the fuel injector actuator is shown. The sequence of FIG. 10 may be provided by the system of FIGS. 1-4 by utilizing the method of FIG. 9 in conjunction with the method of FIG. 6. The first, second and third plots of FIG. 10 are similar to the first, the second, and the third plots of FIG. 8, therefore the descriptions of the plots are omitted for the sake of brevity. Briefly, the first plot includes trace 1002 showing change in a position of an annulus cut portion of a fuel injector assembly over time, the second plot includes trace 1004 showing change in current supplied to the actuator over time, and the third plot includes trace 1006 showing change in fuel injection rate over time. All plots show time increasing along the direction of the X-axis arrow.

At time t0 the fuel injector needle is held in a first position, such as the first position 210 shown at FIG. 1, where the annulus cut portion of the fuel injector is above the first row nozzles and the second row nozzles, and is not coupled to either first or second row nozzles. Thus, fuel supply 240 is decoupled from the nozzles and fuel delivery does not take place.

Between times t0 and t1, current is delivered to the actuator. The current may be linearly increased with time in order to move the fuel injector from the first position to an intermediate position between the first and the second row nozzles via a second position, such as the second position 301 shown at FIG. 3. As the current increases, the injector needle moves downwards from the first position towards the first row nozzles.

At t1, the annulus cut portion of the fuel injector needle starts coupling with the first row nozzles. As a result, at t1, pilot fuel injection begins and fuel in injected into the environment in which the fuel injector is position. That is, in case of direct fuel injection, fuel is injected into the engine cylinder and in case of port fuel injection; fuel is injected into the intake manifold.

Between t1 and t2, as the current to the actuator is increased, the injector needle is further pushed downwards and a region of coupling between the annulus cut portion and the first row nozzles increases. Accordingly, pilot fuel injection continues with increased fuel injection rate.

At t2, the annulus cut portion is fully coupled to the first row nozzles. Further, at t2, current continues to be supplied in a linearly increasing manner. As a result, the injector needle continues to travel downwards towards the second row nozzles between t2 and t3. As the needle travels downwards, the annulus cut portion remains fully coupled to the first row nozzles. As a result, between t2 and t3, pilot fuel injection continues via the first row nozzles.

Immediately after t3, the annulus cut portion starts decoupling from the first row nozzles. Consequently, fuel injection rate decreases. At t4, the annulus cut portion of the fuel injector is completely decoupled from the first row nozzles, and the pilot fuel injection stops. Between t4 and t5, the injector needle is pushed further downwards by the actuator until the intermediate position (t5) between the first and the second row nozzles is reached. At the intermediate position, the annulus cut portion is fully decoupled from the first and the second row nozzles. Soon after the intermediate position is reached, current is decreased to move the injector needle upwards away from the second row nozzles and towards the first row nozzles. Thus, between t5 and t6, the current is decreased and the injector needle moves upwards. As the injector needle moves upwards, the annulus cut portion starts coupling with the first row nozzles at t6. The coupling with the first row nozzles increases between t6 and t7, and at t7, the annulus cut portion is fully coupled to the first row nozzles. When the annulus cut portion is fully coupled to the first row nozzles, a constant holding current is supplied to the actuator in order to maintain the full coupling for a desired duration. The annulus cut portion remains fully coupled with the first row nozzles until t8. Just prior to t8, the current to the actuator is decreased. As a result, the injector moves upwards. For a brief period after the current is decreased, the annulus portion remains fully coupled with the first row nozzles. Soon after t8, as the current is further decreased, the injector needle moves upwards and the annulus cut portion starts decoupling from the first row nozzles. At t9, the annulus cut portion is fully decoupled from the first row nozzles. Thus, from time t6 to t9, fuel is injected via the first row nozzles as long as there is some coupling between the annulus cut portion and the first row nozzles. That is, the main fuel injection event occurs between t6 and t9. At t9, fuel injection stops.

Between t9 and t10, the fuel injector needle continues to move upwards by the forces of the retention springs as the current is decreased. At t10, the fuel injector needle comes to the first position and movement of the fuel injector needle stops. At t10 and beyond, the fuel injector needle is held in the first position by the retention springs. Additionally, an upper portion of the fuel injector body may prevent further movement of the injector in the upward direction.

In this way, the fuel injector assembly may be utilized to provide two fuel injections including a pilot and a main injection by floating the injector in between the first and the second row nozzles.

Returning to 902, if main and post fuel injections are desired, method 900 proceeds to 914. At 914, method 900 includes moving the fuel injector from the first position (closed position when no fuel injection is performed) to a second position, such as position 302 at FIG. 3, where the annulus portion is coupled to the first row nozzles by supplying current to the actuator. The current may be a variable current. As the needle travels downwards and begins coupling with the first row nozzles, fuel delivery via the first row nozzles is also initiated.

When the annulus cut portion is fully coupled to the first row nozzles, method 900 proceeds to 916. At 916, method includes providing a holding current for a desired duration to deliver desired fuel amount via the first row nozzles, thereby performing a main fuel injection.

Next, upon delivering the desired fuel amount, method 900 proceeds to 918. At 918, method 900 includes further increasing current to the actuator to move the injector needle downwards such that the annulus cut portion of the fuel injector needle travels past the first row and is suspended between the first and second row nozzle without being coupled to either first or second row nozzles. When the annulus cut portion of the fuel injector is between the first and the second row nozzles and not coupled to either first or second row nozzles, method 900 proceeds to 920.

At 920, method 900 includes deactivating the actuator. Deactivating the actuator includes gradually decreasing current supplied to the actuator. As the current is decreased, the needle moves upwards. As the needle travels upwards, the annulus cut portion is coupled to the first row nozzles, during which time the fuel is delivered via the first row nozzles. This provides a post fuel injection. That is, when the fuel injector is moving upwards from the position between the first and the second row nozzles to the closed position above the first row nozzles (first position), post fuel injection is delivered via the first row nozzles during the time period when the annulus cut portion of the needle is coupled with the first row nozzles. Subsequently, as the injector moves further upwards by the force of the retention springs, the annulus cut portion is decoupled from the first row nozzles, thereby ending the post fuel injection. Finally, when the actuator current is decreased to zero, the fuel injector needle is held closed in the first position by the retention springs and further upward movement may be stopped by the upper portion of the fuel injector body.

In this way, a main and a post fuel injection may be delivered by utilizing the fuel injector assembly. An example of a fuel injection sequence wherein the fuel injector assembly is utilized to deliver a main and a post fuel injection during a single actuation cycle of the fuel injector is shown in the sequence of FIG. 11.

Referring now to FIG. 11, a sequence 1100 for performing two fuel injections including a main and a post fuel injection during a single combustion cycle through a single actuation cycle of the fuel injector actuator is shown. The sequence of FIG. 11 may be provided by the system of FIGS. 1-4 by utilizing the method of FIG. 9 in conjunction with the method of FIG. 6. The first, second and third plots of FIG. 10 are similar to the first, the second, and the third plots of FIG. 8, therefore the descriptions of the plots are omitted for the sake of brevity. Briefly, the first plot includes trace 1102 showing change in a position of an annulus cut portion, such as lower annulus cut portion 224 at FIGS. 2-5, of a fuel injector assembly over time, the second plot includes trace 1104 showing change in current supplied to the actuator over time, and the third plot includes trace 1106 showing change in fuel injection rate over time. All plots show time increasing along the direction of the X-axis arrow.

At time t0, the fuel injector needle is held in a first position, such as the first position 210 shown at FIG. 1, where the annulus cut portion of the fuel injector is above the first row nozzles and the second row nozzles, and is not coupled to either first or second row nozzles. Thus, fuel supply 240 is decoupled from the nozzles and fuel delivery does not take place.

Between times t0 and t1, current is delivered to the actuator. The current may be linearly increased with time in order to move the fuel injector from the first position to a second position, such as the second position 301 shown at FIG. 3. As the current increases, the injector needle moves downwards from the first position towards the first row nozzles.

At t1, the annulus cut portion of the fuel injector needle starts coupling with the first row nozzles. As a result, at t1, fuel injection begins. Between t1 and t2, as the current to the actuator is increased, the injector needle is further pushed downwards and a region of coupling between the annulus cut portion and the first row nozzles increases. Accordingly, fuel injection continues with increased fuel injection rate.

At t2, the annulus cut portion is fully coupled to the first row nozzles. When the annulus cut portion is fully coupled to the first row nozzles, a constant holding current is supplied to the actuator in order to maintain the full coupling for a desired duration to deliver a desired fuel injection amount. The constant holding current is supplied until t3. Thus, fuel is injected via the first row nozzles between t2 and t3, and at t3. Soon after t3, current is increased to move the injector further downwards towards the second row nozzles. For a brief time after t3, the annulus cut portion remains fully coupled with the first row nozzles, and at t4, the annulus cut portion starts decoupling from the first row nozzles. The annulus cut portion is fully decoupled at t5. As discussed above, fuel injection continues as long as there is some amount of fluidic coupling between the annular cut portion and the first row nozzles. Thus, fuel injection continues between t3 and t5 but at decreased injection rates. At t5, when the annulus cut portion is fully decoupled from the first row nozzles, the fuel injection stops. The fuel injection that occurs between t1 and t5 constitutes the main fuel injection event, wherein fuel injected is utilized for combustion to provide a desired torque output for propelling the vehicle.

Current supply to the actuator is continued between t5 and t6 until the fuel injector needle may be suspended at an intermediate position between the first and the second row nozzles, wherein the annular cut portion is decoupled from the first and the second row nozzles. After reaching the intermediate position between t5 and t6, current is decreased. Specifically, the current is decreased until the fuel injector needle reaches the first position.

As the current is decreased, the fuel injector needle travels upwards away from the second row nozzles to the first row nozzles. At t6, the annulus cut portion starts coupling with the first row nozzles. The coupling with the first row nozzles increases between t6 and t7, and at t7, the annulus cut portion is fully coupled to the first row nozzles. The annulus cut portion remains fully coupled with the first row nozzles until t8. Soon after t8, the injector needle moves upwards and the annulus cut portion starts decoupling from the first row nozzles. At t9, the annulus cut portion is fully decoupled from the first row nozzles. Thus, from time t6 to t9, fuel is injected via the first row nozzles as the fuel injector needle is drawn upwards towards the first position from the intermediate position. This constitutes the post fuel injection. At t9, post fuel injection stops.

Between t9 and t10, the fuel injector needle continues to move upwards by the forces of the retention springs as the current is decreased. At t10, the fuel injector needle comes to the first position and movement of the fuel injector needle stops. At t10 and beyond, the fuel injector needle is held in the first position by the retention springs. Additionally, an upper portion of the fuel injector body may prevent further movement of the injector in the upward direction.

In this way, the fuel injector assembly may be utilized to provide two fuel injections including a main and a post injection by floating the injector in between the first and the second row nozzles.

Figure 12:
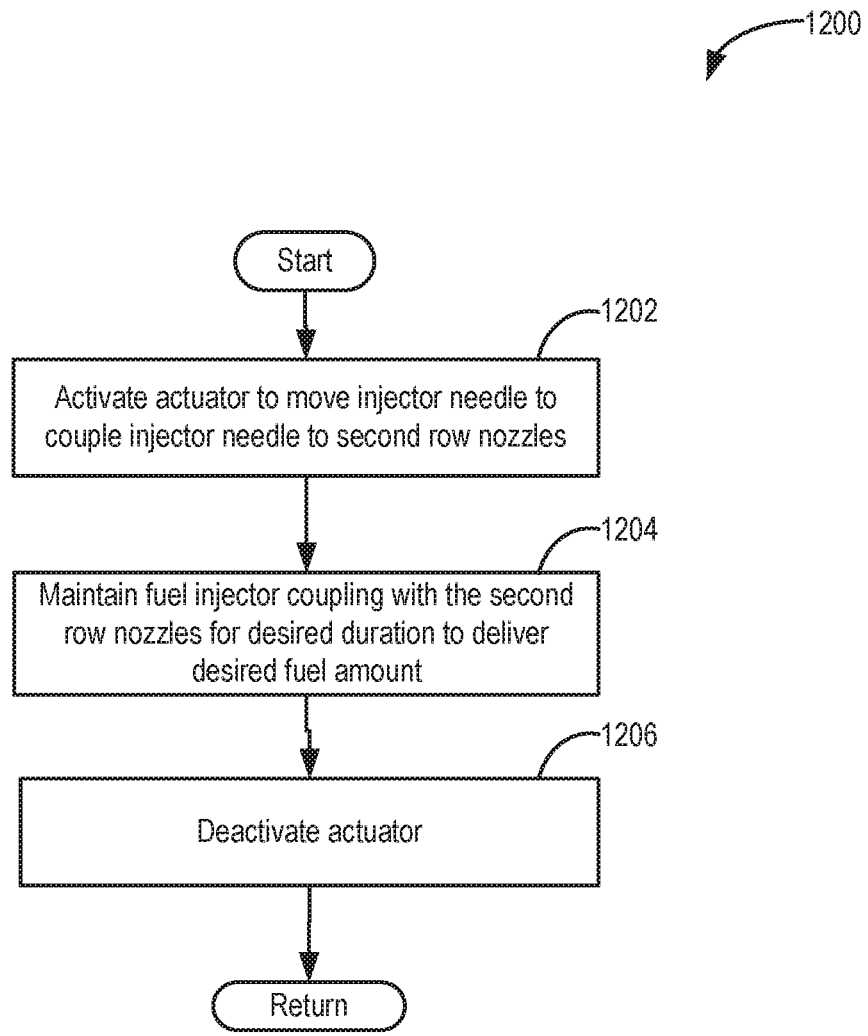
FIG. 12 is a flow chart illustrating an example method for performing three fuel injections during a single combustion cycle.
Figure 13:
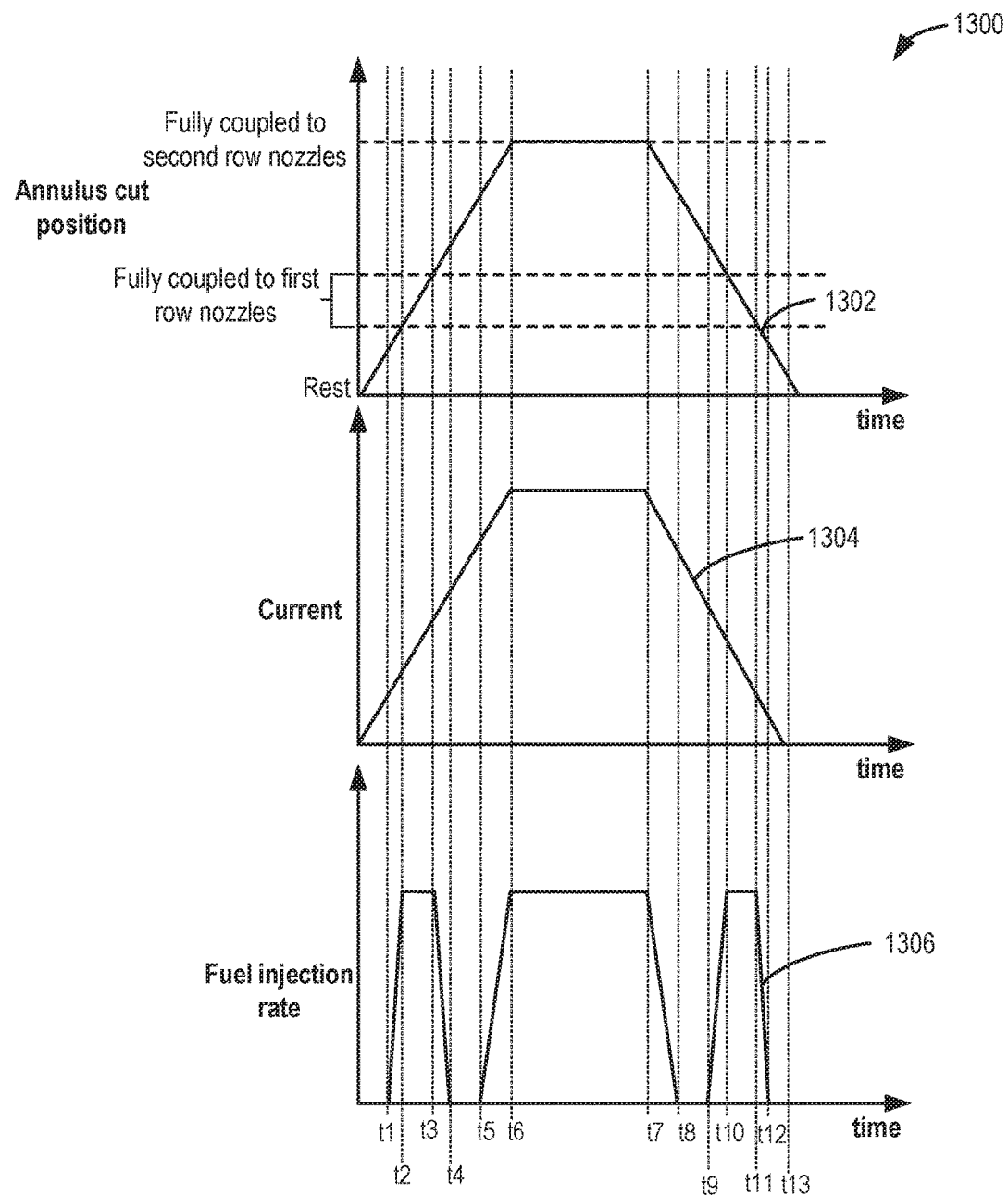
FIG. 13 shows an example operating sequence for performing a pilot, a main, and a post fuel injection according to the present disclosure.

FIG. 12 illustrates an example method 1200 for delivering three fuel injections by utilizing a fuel injector assembly, such as fuel injector assembly 200 shown at FIGS. 2-5. The fuel injections may be performed during a single combustion cycle with a single actuation of a fuel injector actuator, such as actuator 202 at FIG. 2. Specifically, the method illustrates control of a fuel injector actuator, such as actuator 202 at FIG. 2, for delivering a pilot, a main, and a post fuel injection.

Method 1200 begins at 1202. At 1202, method 1200 includes activating the fuel injector actuator to move the fuel injector needle to fluidically couple the fuel supply to the second row nozzles. In this example, it may be assumed that prior to activation, the fuel injector assembly is initially is a closed state, where no signal is supplied to the actuator and the fuel injector needle is decoupled from the first and the second row nozzles. When operating in the closed state, the fuel injector assembly may be in a first position, such as the first position 201 shown in FIG. 2. Therefore, activating the fuel injector actuator includes providing a signal for a first desired duration to the fuel injector actuator to move the injector for a second desired distance. The signal may be an electrical signal, such as a current, and the second desired distance may be a distance that the fuel injector may travel from the closed (first) position to a third position, such as position 402 at FIG. 4, where the injector is fully coupled to the second row nozzles. Thus, a controller may supply a desired current to the fuel injector actuator to move the fuel injector needle for the second desired distance. The desired current may be a variable current to provide desired force for the second desired travel distance of the injector needle. The desired current, the second desired distance, and the first desired duration may be pre-determined during an injector characterization operation, for example.

For example, a controller may determine a desired current to move the actuator to couple an annulus cut portion, such as lower annulus cut portion 224 at FIGS. 2-5, of the fuel injector needle to the second row nozzles of the fuel injector. The controller may then supply the desired current to the fuel injector actuator. As the force provided by the actuator is greater than the force provided by the return springs and acts in direction opposite to the force of the return springs, responsive to the signal provided by the controller, the fuel injector actuator pushes the fuel injector needle in a downward direction along a longitudinal axis of the fuel injector assembly. As a result, the fuel injector moves from the first position to a third position, such as the third position 401 shown at FIG. 4, at which the annulus cut portion of the fuel injector needle is fully coupled to the second row nozzles.

As the injector needle moves from the first position to the third position, the annulus cut portion of the injector needle couples to the first row nozzles prior to coupling with the second row nozzles. When the annulus cut portion of the fuel injector needle is coupled to the first row nozzles, fuel supply is coupled to the first row nozzles via the annulus cut portion. As a result, fuel is delivered from the fuel supply via the first row nozzles, thereby providing a pilot fuel injection. The desired current may continue to be provided. As a result, the fuel injector needle is pushed further down. Consequently, the annulus cut portion is decoupled from the first row nozzles, and is coupled to the second row nozzles. Thus, when the actuator is supplied with the desired current for the first desired duration the annulus cut portion of the fuel injector needle moves from the first position, where the annulus cut portion is decoupled from the first or second row nozzles, to the third position coupled with the second row nozzles, via the first row nozzles. When the first desired duration is completed, the annulus cut portion is fully coupled to the second row nozzles.

After supplying the actuator with the desired current for the first desired duration, method 1200 proceeds to 1204. At 1204, method 1200 includes maintaining fuel injector coupling with the second row nozzles to provide a main fuel injection via the second row nozzles. Coupling with the second row nozzles may be maintained by providing a holding current. Further, the holding current may be provided for a second desired duration to provide a desired fuel injection amount. The holding current may be a constant current and may be provided to maintain the fluidic coupling between the fuel supply and the second row nozzles for the desired duration. The second desired duration may be based on a desired fuel injection amount, for example. Accordingly, if a larger amount of fuel injection is desired, the second desired duration of providing the holding current may be greater. As such, the desired fuel injection amount, or fuel demand may be based on a pedal position (pp), engine speed (N), and measured mass air flow (MAF). Note that this fuel injection amount can also be determined based on other parameters. For example, a two-dimensional map of engine speed and pedal position can be used. Alternatively, a two-dimensional map of pedal position and vehicle speed can also be used.

Upon maintaining the fuel injector needle coupling with the second row nozzles for the desired duration, method 1200 proceeds to 1206. At 1206, method 1200 includes deactivating the fuel injector actuator. In one example, as illustrated at FIG. 13, deactivating the fuel injector actuator includes gradually decreasing the electric signal supplied to the actuator. For example, when current is utilized to activate and deactivate the actuator, the current may be decreased from the holding current to zero current gradually over a period of time. As the current is decreased, the force provided by the actuator is decreased and the fuel injector needle moves upwards along the longitudinal axis of the needle by the force of the retention springs. As a result, as the injector needle moves upwards, the annulus cut portion of the fuel injector needle is decoupled from the second row nozzles. Subsequently, as the needle continues to move upwards, the annulus cut portion is coupled to the first row nozzles, during which time the fuel is delivered via the first row nozzles. This provides a post fuel injection. That is, when the fuel injector is moving upwards from the third position (coupled to the second row nozzles) to the closed position above the first row nozzles (first position), post fuel injection is delivered via the first row nozzles during the time period when the annulus cut portion of the needle is coupled with the first row nozzles. Subsequently, as the injector moves further upwards by the force of the retention springs, the annulus cut portion is decoupled from the first row nozzles, thereby ending the post fuel injection. Finally, when the actuator current is decreased to zero, the fuel injector needle is held closed in the first position by the retention springs and further upward movement may be stopped by the upper portion of the fuel injector body.

In one example, deactivating the fuel injector actuator includes stopping the electric signal to the actuator. As discussed above, in the absence of an electric signal to the electric actuator, the plurality of retention springs coupled to the injector body and the injector needle push the needle upward along the longitudinal axis, away from the nozzles. Thus, the retention springs act to move the needle to the first position and hold the needle in the first position. Additionally, the upward movement of the needle may be also stopped by an upper portion of the fuel injector body, as illustrated above at FIG. 2.

In this way, the fuel injector assembly may be utilized to deliver three fuel injections including a pilot, a main and a post fuel injection via the first row of nozzles through a single actuation cycle (activation, holding, and deactivation) of the actuator. An example of a multiple fuel injection sequence wherein the fuel injector assembly is utilized to deliver a pilot, a main, and a post fuel injection during a single actuation cycle of the fuel injector is shown in the sequence of FIG. 13.

Referring now to FIG. 13, as indicated above, a sequence 1300 for a three fuel injections during a single combustion cycle through a single actuation cycle of the fuel injector actuator is shown. The sequence of FIG. 13 may be provided by the system of FIGS. 1-4 by utilizing the method of FIG. 12 in conjunction with the method of FIG. 6. The first, second and third plots of FIG. 13 are similar to the first, the second, and the third plots of FIG. 8, therefore the descriptions of the plots are omitted for the sake of brevity. Briefly, the first plot includes trace 1202 showing change in a position of an annulus cut portion, such as lower annulus cut portion 224 at FIGS. 2-5, of a fuel injector assembly over time, the second plot includes trace 1204 showing change in current supplied to the actuator over time, and the third plot includes trace 1206 showing change in fuel injection rate over time. All plots show time increasing along the direction of the X-axis arrow.

At time t0, the fuel injector is in a deactivated or rest state, where the fuel injector needle is held in a closed position by the force of the retention springs. In the closed position, the annulus cut portion of the fuel injector is above the first row nozzles and the second row nozzles, and therefore, the annulus cut portion is not coupled to either first or second row nozzles. Thus, fuel supply 240 is decoupled from the nozzles and fuel delivery does not take place.

Between times t0 and t1, an electric signal (that is, current) is supplied to an actuator. As shown, a variable current may be supplied to the actuator. The current may be linearly increased with time in order to move the fuel injector from the first position to a third position via a second position. Responsive to the current supplied, the actuator moves the fuel injector needle in a downward direction along a longitudinal axis of the injector. As the current increases, the injector needle moves further downwards from the rest position towards the first row nozzles. At t1, the annulus cut portion of the fuel injector needle starts coupling with the first row nozzles.

That is, at t1, a portion of the annulus cut portion is coupled to a portion of each of the first row nozzles, thereby forming a region of coupling between the annulus cut portion and the first row nozzles. Thus, at t1, pilot fuel injection begins and fuel in injected into the environment in which the fuel injector is position. That is, in case of direct fuel injection, fuel is injected into the engine cylinder and in case of port fuel injection, fuel is injected into the intake manifold.

Between t1 and t2, as the current to the actuator is increased, the injector needle is further pushed downwards and the region of coupling between the annulus cut portion and the first row nozzles increases. According fuel injection rate increases.

At t2, the annulus cut portion is fully coupled to the first row nozzles. Further, at t2, current continues to be supplied in a linearly increasing manner. Accordingly, at between t2 and t3 and at t3 injector needle continues to travel downwards towards the second row nozzles. Further, between t2 and t3, the annulus cut portion remains fully coupled to the first row nozzles. As a result, at t3 and between t2 and t3, pilot fuel injection continues via the first row nozzles.

After t3, the current continues to be supplied and the fuel injector moves further down. As a result, immediately after t3, the annulus cut portion starts decoupling from the first row nozzles. Consequently, fuel injection rate decreases. At t4, the annulus cut portion of the fuel injector is completely decoupled from the first row nozzles, and the pilot fuel injection stops.

Between t4 and t5, the current supply to the actuator continues, and the annulus cut portion is between the first and second row nozzle without being coupled to either first or second row nozzles. Thus, fuel is not injected between t4 and t5.

At t5, a portion of the annulus cut portion is coupled to a portion of each of the second row nozzles, thereby forming a region of coupling between the annulus cut portion and the second row nozzles. Thus, at t5, main fuel injection begins and fuel in injected into the environment in which the fuel injector is position via the second row nozzles.

Between t5 and t6, as the current to the actuator is increased, the injector needle is further pushed downwards and the region of coupling between the annulus cut portion and the second row nozzles increases. As a result, main fuel injection rate increases.

At t6, the annulus cut portion is fully coupled to the second row nozzles. Between t6 and t7, a constant holding current is supplied to the actuator. As a result, the annulus cut portion of the fuel injector needle remains fully coupled to the second row nozzles between times t6 and t7, and the fuel is delivered at a constant fuel injection rate via the second row nozzles. The time duration between t6 and t7 may be based on the desired fuel injection amount. For example, if greater fuel injection amount is desired, the duration between t6 and t7 may be longer.

At t7, deactivation of the actuator may be initiated. The current supply to the actuator is gradually decreased to zero. As a result, the fuel injector needle moves upwards along the longitudinal axis of the fuel injector by the force of the retention springs. As the fuel injector needle moves upwards, between t7 and t8, region of coupling between the annulus cut portion of the fuel injector and the second row nozzle decreases. Hence, the fuel injection rate decreases.

At t8, the annulus cut portion of the fuel injector needle is fully decoupled from the first row nozzles. As a result, main fuel injection is terminated at t8. After t8, as the current is further decreased, the fuel injector needle is pulled further upwards by the force of the retention springs. Between t8 and t9, as the fuel injector moves away from the second row nozzles and towards the first row nozzles, the annulus cut portion is not coupled to either the first row or the second row. Accordingly, between t8 and t9, fuel is not injected.

At t9, as the injector needle continues to move upward, the annular cut portion is again coupled to the first row nozzles. As a result, a post fuel injection begins at t9. Coupling between the annular cut portion and the first row nozzles increase between t9 and t10. As a result, fuel injection rate is increased. At t10, and between t10 and t11, the annular cut portion is fully coupled to the first row nozzles, thereby delivering post fuel injection at a constant rate.

Immediately after t11, as the fuel injector needle continues to move upwards towards the first (close) position, the annular cut portion starts decoupling. As a result, fuel injection rate starts decreasing until t12, when the annular cut portion is fully decoupled from the first row nozzles.

Between t12 and t13, the fuel injector needle continues to move upwards by the forces of the retention springs. At t13, the fuel injector needle comes to the rest position and movement of the fuel injector needle stops. At t13 and beyond, the fuel injector needle is held in rest position by the retention springs. Additionally, an upper portion of the fuel injector body may prevent further movement of the injector in the upward direction.

In this way, through a single actuation cycle of the actuator, three fuel injections (pilot, main, and post) may be performed during a single combustion cycle by utilizing a single fuel injector assembly and during a single actuation cycle of the injector.

As one embodiment, a method for a fuel injector includes controlling an actuator to move an injector needle from a first position to a third position via a second position; delivering a first fuel injection at the second position and a second fuel injection at the third position, and subsequently moving the needle from the third position to the first position via the second position; and delivering a third fuel injection at the second position. In a first example of the method, controlling the actuator to move the needle comprises, during the second fuel injection, holding the needle at the third position for a desired duration, the desired duration based on a desired fuel injection amount. A second example of the method optionally includes the first example and further includes wherein moving the needle from the first position to the third position includes initiating an electrical input to the actuator at the first position and increasing the input to a desired value with time from the first position to the third position, the desired value based on a displacement of the needle from the first position to the third position. A third example of the method optionally includes one or more of the first and second examples, and further includes wherein holding the needle at the third position includes maintaining the input at the desired value for the desired duration. A fourth example of the method optionally includes one or more of the first through third examples, and further includes, wherein moving the needle from the third position to the first position includes decreasing the input with time from the desired value from the third position to the first position and stopping the input when the needle is at the first position. A fifth example of the method optionally includes one or more of the first through fourth examples, and further includes, wherein the input signal is a current. A sixth example of the method optionally includes one or more of the first through fifth examples, and further includes, wherein the first position is vertically above the second position along a longitudinal axis of the needle; and wherein the second position is vertically above the third position along the longitudinal axis of the needle.

As another embodiment, a method for a fuel injector includes controlling an injector actuator to displace a needle of the injector to deliver a first fuel injection, a second fuel injection, and a third fuel injection during a single actuation cycle of the fuel injector during a single combustion cycle of an engine cylinder. In a first example of the method, controlling the injector actuator includes wherein a single actuation cycle comprises a first displacement of the injector from a first position to a third position via a second position followed by a second displacement of the injector from the third position to the first position via the second position. A second example of the method optionally includes the first example and further includes wherein delivering the first injection includes initiating a current supply to the actuator when the needle is at the first position and increasing the current to a desired value to displace the needle to the third position via the second position and delivering the first fuel injection at the second position; and wherein the desired value is based on a force required to displace the needle from the first position to the third position. A third example of the method optionally includes one or more of the first and second examples, and further includes wherein delivering the second fuel injection includes maintaining the current at the desired value for a desired duration and delivering the second fuel injection at the third position, the desired duration based on a desired fuel injection amount; and wherein delivering the third fuel injection includes decreasing the current from the desired value to zero to displace the needle from the third position to the first position via the second position and delivering the third fuel injection at the third position. A fourth example of the method optionally includes one or more of the first through third examples, and further includes wherein a first displacement distance of the needle from the first position to the second position is less than a second displacement distance of the needle from the first position to the third position. A fifth example of the method optionally includes one or more of the first through fourth examples, and further includes wherein at the second position, a first end of an annulus cut portion of the injector needle is coupled to a first row of nozzles of an injector body, the injector needle positioned in a movable manner along a longitudinal axis of the body within a hollow cylindrical chamber of the body; wherein at the third position, the first end of the annulus cut portion is coupled to a second row of nozzles of the injector body; and wherein, at the first position, the first end of the annulus cut portion is not coupled to either first row or second row of nozzles. A sixth example of the method optionally includes one or more of the first through fifth examples, and further includes wherein a second end of the annulus cut portion is coupled to a fuel supply via a fuel path within the needle.

As yet another embodiment, fuel injector system includes a fuel injector body including a first nozzle positioned vertically above a second nozzle; a fuel injector needle movable within the injector body, the needle including an annular cut portion for coupling a fuel supply to the first or the second nozzle; a plurality of sealing rings located along the injector body hermetically sealing the first nozzle from the second nozzle, the plurality of sealing rings including a first sealing ring positioned between the first nozzle and the second nozzle, a second sealing ring positioned above the first nozzle, and a third sealing ring positioned above the second sealing ring; an actuator for controlling a movement of the needle; and a controller having executable instructions stored in a non-transitory memory for: performing a first actuation cycle of the needle to conduct a first pilot fuel injection, a first main fuel injection, and a first post fuel injection; performing a second actuation cycle of the needle to conduct a second pilot fuel injection and a second main fuel injection; performing a third actuation cycle of the needle to conduct a third main fuel injection and a third post fuel injection; and performing a fourth actuation cycle of the needle to conduct a fourth main fuel injection. In a first example of the system, the fuel injector includes wherein the first actuation cycle includes actuating the injector needle in a downward direction to deliver the first pilot fuel injection via the first nozzle; actuating the injector needle further in the downward direction to couple the annulus cut portion with the second nozzle and maintaining the coupling with the second nozzle for a first desired duration to conduct the first main fuel injection via the second nozzle; and actuating the injector needle in an upward direction to conduct the first post fuel injection via the first nozzle row. A second example of the system optionally includes the first example and further includes, wherein the second actuation cycle includes actuating the injector needle in the downward direction to deliver the second pilot fuel injection via the first nozzle; actuating the injector needle further in the downward direction to float the annulus cut portion between the first and the second nozzles; and actuating the injector needle in the upward direction to couple the annulus cut portion with the first nozzle and maintaining the coupling with the first nozzle for a second desired duration to conduct the second main fuel injection via the first nozzle. A third example of the system optionally includes one or more of the first and second examples, and further includes wherein the third actuation cycle includes actuating the injector needle in the downward direction to couple the annulus cut portion with the first nozzle and maintaining the coupling with the first nozzle for a third desired duration to deliver the third main fuel injection via the first nozzle; actuating the injector needle further in the downward direction to float the annulus cut portion between the first and the second nozzles; and actuating the injector needle in the upward direction to conduct the third post fuel injection via the first nozzle. A fourth example of the system optionally includes one or more of the first through third examples, and further includes, wherein the fourth actuation cycle includes actuating the injector needle in the downward direction to couple the annulus cut portion with the first nozzle and maintaining the coupling with the first nozzle for a fourth desired duration to deliver the fourth main fuel injection via the first nozzle; and actuating the injector needle in the upward direction to decouple the annulus cut portion from the first nozzle.

A fifth example of the system optionally includes one or more of the first through fourth examples, and further includes, wherein the actuator controls the movement of the needle based on an electrical input from the controller.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a fuel injector comprising:
sending an electrical signal from a controller to an actuator, the actuator coupled to an injector needle, wherein the electrical signal causes the actuator, in a single actuation cycle and during a single combustion cycle, to:
move the injector needle downward from a first position to a third position via a second position, wherein a first fuel injection is delivered at the second position and a second fuel injection is delivered at the third position, and, subsequently,
move the injector needle upwards from the third position to the first position via the second position, wherein a third fuel injection is delivered at the second position,
wherein the injector needle is coupled to a fuel supply, and
wherein fuel from the fuel supply is introduced into a combustion chamber via delivery of the first fuel injection, the second fuel injection, and the third fuel injection.

2. The method of claim 1, further comprising, during the second fuel injection, holding the injector needle at the third position for a desired duration, the desired duration based on a desired fuel injection amount.

3. The method of claim 2, wherein moving the injector needle from the first position to the third position includes initiating an electrical input to the actuator at the first position and increasing the input to a desired value with time from the first position to the third position, the desired value based on a displacement of the injector needle from the first position to the third position.

4. The method of claim 3, wherein holding the injector needle at the third position includes maintaining the input at the desired value for the desired duration.

5. The method of claim 4, wherein moving the injector needle from the third position to the first position includes decreasing the input with time from the desired value from the third position to the first position and stopping the input when the injector needle is at the first position.

6. The method of claim 5, wherein the input is a current.

7. The method of claim 1, wherein the first position is vertically above the second position along a longitudinal axis of the injector needle, and wherein the second position is vertically above the third position along the longitudinal axis of the injector needle.

8. A method for a fuel injector, comprising:
sending an electrical signal from a controller to an injector actuator, the injector actuator coupled to an injector needle, wherein the electrical signal causes the injector actuator to displace the injector needle to deliver a first fuel injection, a second fuel injection, and a third fuel injection during a single actuation cycle of the injector actuator during a single combustion cycle of an engine cylinder,
wherein the injector needle is coupled to a fuel supply, and
wherein fuel from the fuel supply is introduced into the engine cylinder via delivery of the first fuel injection, the second fuel injection, and the third fuel injection.

9. The method of claim 8, wherein the single actuation cycle comprises a first displacement of the injector needle from a first position to a third position via a second position followed by a second displacement of the injector needle from the third position to the first position via the second position.

10. The method of claim 9, wherein delivering the first injection includes initiating a current supply to the injector actuator when the injector needle is at the first position and increasing the current to a desired value to displace the injector needle to the third position via the second position and delivering the first fuel injection at the second position, and wherein the desired value is based on a force required to displace the injector needle from the first position to the third position.

11. The method of claim 9, wherein delivering the second fuel injection includes maintaining the current at the desired value for a desired duration and delivering the second fuel injection at the third position, the desired duration based on a desired fuel injection amount, and wherein delivering the third fuel injection includes decreasing the current from the desired value to zero to displace the injector needle from the third position to the first position via the second position and delivering the third fuel injection at the third position.

12. The method of claim 11, wherein a first displacement distance of the injector needle from the first position to the second position is less than a second displacement distance of the injector needle from the first position to the third position.

13. The method of claim 9, wherein, at the second position, a first end of an annulus cut portion of the injector needle is coupled to a first row of nozzles of an injector body, the injector needle positioned in a movable manner along a longitudinal axis of the body within a hollow cylindrical chamber of the body; wherein, at the third position, the first end of the annulus cut portion is coupled to a second row of nozzles of the body; and wherein, at the first position, the first end of the annulus cut portion is not coupled to either the first or second row of nozzles.

14. The method of claim 13, wherein a second end of the annulus cut portion is coupled to a fuel supply via a fuel path within the injector needle.

* * * * *